United States Patent
Nakajima

(10) Patent No.: US 9,733,599 B2
(45) Date of Patent: Aug. 15, 2017

(54) IMAGE FORMING APPARATUS

(71) Applicant: CANON KABUSHIKI KAISHA, Tokyo (JP)

(72) Inventor: Nozomu Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 14/713,574

(22) Filed: May 15, 2015

(65) Prior Publication Data

US 2015/0331371 A1    Nov. 19, 2015

(30) Foreign Application Priority Data

May 16, 2014 (JP) .................................. 2014-102158

(51) Int. Cl.
    *G03G 15/20*     (2006.01)
    *G01K 7/22*     (2006.01)

(52) U.S. Cl.
    CPC ........... *G03G 15/2046* (2013.01); *G01K 7/22* (2013.01); *G03G 15/2039* (2013.01); *G03G 2215/2035* (2013.01)

(58) Field of Classification Search
    CPC ............ G03G 15/2039; G03G 9/0823; G03G 15/2046; G03G 9/0819; G03G 9/0827; G03G 15/2017; G03G 15/2053; G03G 15/2064; G03G 15/2082; G03G 2215/2032; G03G 9/09791; G03G 15/6552; G03G 15/6591; G01K 7/22
    USPC ......................................................... 399/69
See application file for complete search history.

(56) References Cited

U.S. PATENT DOCUMENTS

| | | | | |
|---|---|---|---|---|
| 6,298,215 B1* | 10/2001 | Nomura | ............ | G03G 15/2042 219/619 |
| 2002/0088789 A1* | 7/2002 | Hirai | .................... | H05B 3/0095 219/216 |
| 2004/0240913 A1* | 12/2004 | Tomatsu | ............ | G03G 15/2064 399/328 |
| 2012/0027444 A1* | 2/2012 | Kitagawa | ........... | G03G 15/2032 399/69 |

(Continued)

FOREIGN PATENT DOCUMENTS

| | | |
|---|---|---|
| JP | H11-84919 | 3/1999 |
| JP | 2000-206809 | 7/2000 |
| JP | 2003-007435 | 1/2003 |

(Continued)

*Primary Examiner* — Roy Y Yi
(74) *Attorney, Agent, or Firm* — Fitzpatrick, Cella, Harper & Scinto

(57) ABSTRACT

An image forming apparatus has a fixing device for heating and fixing an unfixed image formed on a recording material. The fixing device includes a heater having a heat generating element and a substrate, a heat leveling member contacting the heater and having a thermal conductivity higher than that of the substrate, and a temperature detector for detecting the temperature of the heat leveling member. The apparatus also has a controller for controlling electric power supplied to the heat heater to maintain a target temperature. The period in which the heat controller raises the target temperature with an increase of a number of the recording materials is provided in a period in which recording materials having widths smaller a width of a maximum size recording material usable with the device are continuously subjected to fixing operations.

15 Claims, 25 Drawing Sheets

CORRECTION TABLE
LETTER LEGAL

| | NO. | SHEET (°C) | INTVL (°C) |
|---|---|---|---|
| ONE-SIDED | 1~10 | ΔT | ΔT |
| | 11~ | 8-ΔT | 8-ΔT |

A4

| | NO. | SHEET (°C) | INTVL (°C) |
|---|---|---|---|
| ONE-SIDED | 1~8 | 0.6×ΔT | 0.6×ΔT |
| | 9~ | 23-ΔT | 22-ΔT |

(56) References Cited

U.S. PATENT DOCUMENTS

2014/0138372 A1   5/2014   Ogura

FOREIGN PATENT DOCUMENTS

| JP | 2008-216741 | 9/2008 |
| JP | 2014-102429 | 6/2014 |

* cited by examiner

TARGET TEMP. TABLE

LETTER A4 LEGAL B5

| | NO. | SHEET (°C) | INTVL (°C) |
|---|---|---|---|
| ONE-SIDED | 1~100 | 220 | 215 |
| | 101~250 | 215 | 210 |
| | 251~255 | 212 | 207 |
| | 256~ | 210 | 205 |

FIG.6A

LETTER A4 LEGAL B5

| | NO. | 1ST SIDE | | | 2ND SIDE | |
|---|---|---|---|---|---|---|
| | | SHEET 1 | INTVL 1 | STRT | SHEET 2 | INTVL 2 |
| TWO-SIDED | 1~148 | 220 | 160 | 190 | 210 | 160 |
| | 149~1417 | 215 | 155 | 185 | 205 | 154 |
| | 1418~3253 | 210 | 150 | 180 | 200 | 149 |
| | 3254~5467 | 205 | 145 | 175 | 195 | 143 |
| | 5468~6952 | 200 | 140 | 175 | 190 | 138 |
| | 6953~ | 195 | 135 | 175 | 185 | 132 |

FIG.6B

CORRECTION TABLE
LETTER LEGAL

| | NO. | SHEET (°C) | INTVL (°C) |
|---|---|---|---|
| ONE-SIDED | 1~10 | +0 | +0 |
| | 11~30 | +2 | +2 |
| | 31~65 | +4 | +4 |
| | 66~ | +5 | +5 |

| | NO. | SHEET (°C) | INTVL (°C) |
|---|---|---|---|
| ONE-SIDED | 1~5 | +0 | +0 |
| | 6~20 | +2 | +2 |
| | 21~35 | +4 | +4 |
| | 36~50 | +5 | +5 |
| | 51~70 | +6 | +6 |
| | 71~150 | +8 | +7 |
| | 151~ | +10 | +9 |

| | NO. | SHEET (°C) | INTVL (°C) |
|---|---|---|---|
| ONE-SIDED | 1~5 | +2 | +2 |
| | 6~20 | +6 | +6 |
| | 21~35 | +10 | +10 |
| | 36~50 | +12 | +12 |
| | 51~70 | +15 | +15 |
| | 71~120 | +18 | +17 |
| | 121~200 | +20 | +19 |
| | 201~250 | +22 | +21 |
| | 251~ | +24 | +22 |

FIG.7C

LETTER LEGAL

| | NO. | 1ST SIDE | | | 2ND SIDE | |
|---|---|---|---|---|---|---|
| | | SHEET 1 | INTVL 1 | STRT | SHEET 2 | INTVL 2 |
| TWO-SIDED | 1~10 | +0 | +0 | +0 | +0 | +0 |
| | 11~30 | +2 | +1 | +1 | +2 | +1 |
| | 31~65 | +4 | +2 | +2 | +4 | +2 |
| | 66~80 | +5 | +4 | +4 | +5 | +4 |
| | 81~ | +8 | +6 | +6 | +8 | +6 |

| | NO. | 1ST SIDE | | | 2ND SIDE | |
|---|---|---|---|---|---|---|
| | | SHEET 1 | INTVL 1 | STRT | SHEET 2 | INTVL 2 |
| TWO-SIDED | 1~5 | +0 | +0 | +0 | +0 | +0 |
| | 6~20 | +2 | +1 | +1 | +2 | +1 |
| | 21~35 | +4 | +2 | +2 | +4 | +2 |
| | 36~50 | +5 | +4 | +4 | +5 | +4 |
| | 51~70 | +8 | +5 | +5 | +8 | +6 |
| | 71~150 | +9 | +6 | +6 | +9 | +7 |
| | 151~ | +10 | +8 | +8 | +10 | +9 |

| | NO. | 1ST SIDE | | | 2ND SIDE | |
|---|---|---|---|---|---|---|
| | | SHEET 1 | INTVL 1 | STRT | SHEET 2 | INTVL 2 |
| TWO-SIDED | 1~5 | +2 | +2 | +2 | +2 | +2 |
| | 6~20 | +6 | +5 | +5 | +6 | +5 |
| | 21~35 | +10 | +8 | +8 | +10 | +8 |
| | 36~50 | +12 | +10 | +10 | +12 | +10 |
| | 51~70 | +15 | +12 | +12 | +15 | +12 |
| | 71~120 | +18 | +15 | +15 | +18 | +15 |
| | 121~200 | +20 | +17 | +17 | +20 | +17 |
| | 201~250 | +22 | +19 | +19 | +22 | +19 |
| | 251~ | +24 | +20 | +20 | +24 | +20 |

FIG.7F

CORRECTION TABLE
LETTER LEGAL

|  | NO. | SHEET (°C) | INTVL (°C) |
|---|---|---|---|
| ONE-SIDED | 1~10 | ΔT | ΔT |
|  | 11~ | 8-ΔT | 8-ΔT |

|  | NO. | SHEET (°C) | INTVL (°C) |
|---|---|---|---|
| ONE-SIDED | 1~8 | 0.6×ΔT | 0.6×ΔT |
|  | 9~ | 23-ΔT | 22-ΔT |

|  | NO. | SHEET (°C) | INTVL (°C) |
|---|---|---|---|
| ONE-SIDED | 1~5 | 0.5×ΔT | 0.5×ΔT |
|  | 6~ | 32-ΔT | 30-ΔT |

FIG.11C

LETTER LEGAL

|  | NO. | 1ST SIDE | | | 2ND SIDE | |
|---|---|---|---|---|---|---|
|  |  | SHEET 1(°C) | INTVL 1(°C) | STRT(°C) | SHEET 2(°C) | INTVL 2(°C) |
| TWO-SIDED | 1~10 | ΔT | ΔT | ΔT | ΔT | ΔT |
|  | 11~ | 8-ΔT | 7-ΔT | 7-ΔT | 8-ΔT | 7-ΔT |

|  | NO. | 1ST SIDE | | | 2ND SIDE | |
|---|---|---|---|---|---|---|
|  |  | SHEET 1(°C) | INTVL 1(°C) | STRT(°C) | SHEET 2(°C) | INTVL 2(°C) |
| TWO-SIDED | 1~8 | 0.6×ΔT | 0.5×ΔT | 0.5×ΔT | 0.6×ΔT | 0.5×ΔT |
|  | 9~ | 23-ΔT | 21-ΔT | 21-ΔT | 23-ΔT | 21-ΔT |

|  | NO. | 1ST SIDE | | | 2ND SIDE | |
|---|---|---|---|---|---|---|
|  |  | SHEET 1(°C) | INTVL 1(°C) | STRT(°C) | SHEET 2(°C) | INTVL 2(°C) |
| TWO-SIDED | 1~5 | 0.5×ΔT | 0.4×ΔT | 0.4×ΔT | 0.5×ΔT | 0.4×ΔT |
|  | 6~ | 32-ΔT | 28-ΔT | 28-ΔT | 32-ΔT | 28-ΔT |

FIG.11F

CORRECTION TABLE

LETTER LEGAL

|  | T. FOR SHET (°C) | T. FOR INTRVL (°C) |
|---|---|---|
| ONE-SIDED | 0.3×ΔT | 0.3×ΔT |

|  | T. FOR SHET (°C) | T. FOR INTRVL (°C) |
|---|---|---|
| ONE-SIDED | 0.5×ΔT | 0.4×ΔT |

|  | T. FOR SHET (°C) | T. FOR INTRVL (°C) |
|---|---|---|
| ONE-SIDED | 0.8×ΔT | 0.7×ΔT |

FIG.15C

LETTER LEGAL

|  | 1ST SIDE | | | 2ND SIDE | |
|---|---|---|---|---|---|
|  | SHEET 1(°C) | INTVL 1(°C) | STRT(°C) | SHEET 2(°C) | INTVL 2(°C) |
| TWO-SIDED | 0.3×ΔT | 0.3×ΔT | 0.3×ΔT | 0.3×ΔT | 0.3×ΔT |

|  | 1ST SIDE | | | 2ND SIDE | |
|---|---|---|---|---|---|
|  | SHEET 1(°C) | INTVL 1(°C) | STRT(°C) | SHEET 2(°C) | INTVL 2(°C) |
| TWO-SIDED | 0.5×ΔT | 0.3×ΔT | 0.4×ΔT | 0.5×ΔT | 0.3×ΔT |

|  | 1ST SIDE | | | 2ND SIDE | |
|---|---|---|---|---|---|
|  | SHEET 1(°C) | INTVL 1(°C) | STRT(°C) | SHEET 2(°C) | INTVL 2(°C) |
| TWO-SIDED | 0.8×ΔT | 0.6×ΔT | 0.7×ΔT | 0.8×ΔT | 0.6×ΔT |

FIG.15F

IMAGE FORMING APPARATUS

FIELD OF THE INVENTION AND RELATED ART

The present invention relates to an image forming apparatus.

As a fixing device which is installable in an image forming apparatus such as an electrophotographic copying machine and a printer, there is a fixing device of the so-called film heating type. One of the known fixing devices of the film heating type has a heater comprising a ceramic substrate, a heat generating member disposed on the substrate, a cylindrical flexible fixation film which rotates in contact with the heater, and a pressure roller which forms a nip in cooperation with the heater in the presence of the fixation film between itself and the heater. A sheet of recording medium, that is bearing an unfixed toner image, is conveyed through the nip, remaining pinched by the pressure roller and fixation film. Thus, the unfixed toner image on the sheet of recording medium is heated. Thus, the unfixed toner image is fixed to the sheet.

By the way, it has been known that as a substantial number of prints are continuously outputted by an image forming apparatus that has a fixing device which uses a flexible fixation film, with short intervals, using sheets of recording medium (which hereafter may be referred to as recording paper, printing paper, or paper) which are narrower in width than the widest sheet of recording medium that is usable with the image forming apparatus, the portions of the heater, which are outside the recording medium path (out-of-sheet-path portions of heater) excessively increase in temperature (out-of-sheet-path temperature increase). It has also been known that as the out-of-sheet-path portions of the heater excessively increase in temperature, it is possible that the heater, fixation film, pressure roller, etc., will become damaged.

Thus, a technology which eases the temperature increase of the out-of-sheet-path by placing a member for making the heater uniform in temperature in contact with the heater is disclosed in Japanese Laid-open Patent Application H11-84919.

However, it has become evident that as a fixing device is structured so that the temperature of the heater is monitored through a member that makes the heater uniform in temperature, the detected temperature is significantly different from the actual temperature of the heater.

The mechanism of the occurrence of the above-described phenomenon is as follows. FIGS. 4A-4C shows the structure of the heater 200, the temperature detection element 111, and the protection element 112. FIG. 4A is a plan view of the heater 200 as seen from the side where the overcoat glass 107 is present, and FIG. 4B is a sectional view of the heater 200 at a plane M-M' in FIG. 4A. FIG. 4C is a sectional view of the heater 200 at a plane N-N' in FIG. 4A. Referential code 105 stands for a ceramic substrate; 201, an electrically conductive member; 107, an overcoat glass as an electrical insulator; and referential code 203 stands for a contact for providing an electrical connection between the heater 200 and an unshown connector.

The heating member comprises two sections 204A and 204B, which are serially connected with an electrically conductive member 201. Referential code 205 stands for a strip of thermally conductive substance (heat or temperature leveling member, member for making heater uniform in temperature) which is very high in thermal conductivity. This strip is a piece of metallic plate, metallic paste, carbon sheet, carbon paste, or the like. The strip 205 of thermally conductive substance is substantially higher in thermal conductivity λ (W/m·K) than the ceramic substrate 105. Referential code 111 stands for a temperature detection element (thermistor, or the like), and referential code 112 stands for a protection element (thermo-switch, temperature fuse, or the like). Point Q of the heater 200 is the point of the surface of the heater 200, with which the temperature detection element 111 is placed in contact, whereas point P of the heater 200 is the point of the opposite surface of the heater 200 from the heat generating elements.

Point P is above the surface (which hereafter may be referred to as top surface) of the heater 200, on which the heat generating elements 204A and 204B, electrically conductive section 201, etc. are present, whereas point Q belongs to the temperature detection portion, which are on the surface of the heater 200, on which the temperature detection element and the thermally conductive substance are present.

FIG. 20 is a drawing created by adding phantom images of thermal resistance to FIG. 4C. Point U is a point on the outward surface of the strip 205 of the thermally conductive substance, and corresponds in position to the out-of-sheet-path portions of the heater 200. Referential code R1 stands for the amount of thermal resistance between the out-of-sheet-path temperature increase area and point U, and also, the thermal resistance between point P to point Q; R2, between the out-of-sheet-path temperature increase area to point P; R3, out-of-sheet-path temperature increase area to point Q; referential code R4 stands for the amount of thermal resistance from point U to point Q. By the way, there is also a certain amount of thermal resistance between Point P and point U. However, this thermal resistance is omitted for convenience sake. There are the following relationships among the thermal resistances R1, R2, R3, and R4:

$$R3 > R2 > R1 > R4 \tag{1}$$

$$(R1+R2) > R3 > (R1+R4) \tag{2}$$

Because of the presence of the relationship among the thermal resistances, point P is greater than point Q in the amount by which they receive heat from the out-of-sheet-path areas, and therefore, it becomes higher in temperature than point Q.

Shown in FIGS. 21 and 22 are the changes which occur to the temperature of point P and temperature of point Q of the heater 200 as a continuous printing job (JOB) is carried out by an image forming apparatus. FIG. 21A shows the results of the temperature control of the heater which did not have the strip of thermally conductive substance, and FIG. 21B shows the results of the temperature control of the heater which had the strip of thermally conductive substance.

Referring to FIG. 21A, in the case of the heater having the strip of thermally conductive substance, point P was kept stable in temperature by reducing in steps the temperature of point Q. The longer the length of time the heater 200 is controlled in temperature, the greater the amount by which heat is stored in the pressure roller and fixation film. Thus, if point Q is kept stable in temperature, point P gradually increases in temperature. Therefore, point P was kept stable in temperature by reducing the temperature of point Q in steps.

In the case where the heater is provided with the strip of thermally conductive substance, as point Q is gradually reduced in temperature, the temperature of point P and that of point Q changed as shown in FIG. 21B, which shows that as the length of time the heater is controlled in temperature increases (increase in print count), point P decreases in temperature. In a case where the heater is provided with the strip of thermally conductive substance, point Q becomes higher in temperature than point P. Since the temperature of the heater is controlled based on the temperature of point Q, the heater is controlled in temperature based on the temperature which is higher than the temperature of point P. Therefore, the temperature of point P becomes lower than that of point Q.

Further, the greater the print counts (greater the length of time heater is controlled in temperature), the greater the amount by which heat is supplied to point Q from the out-of-sheet-path portions of the heater; therefore, the greater the difference in temperature between points P and Q. Thus, the greater the amount by which point P reduces in temperature. The temperature control which gradually reduces point Q in temperature is greater in the amount by which point P reduces in temperature than the control which keeps point Q stable in temperature. However, even if point Q is kept stable in temperature, point P still reduces in temperature.

Shown in FIG. 22 are the changes which occurred to the temperature of point P and that of point Q when printing operations (which were different in recording medium type) were carried out by an image forming apparatus, the heater of the fixing device of which was provided with the strip of thermally conductive substance. In a case where recording mediums were sheets of paper of LETTER size, the amount by which the out-of-sheet-path portions of the heater increases in temperature is very small, because the recording medium width is roughly the same as both the length of the heat generating element 204A and the length of the heat generating element 204B.

On the other hand, in a case where recording mediums are sheets of paper of size A4 or B5, the width of which is less than the length of heat generating element 204A and that of the heat generating element 204B, the amount by which the out-of-sheet-path portions increase in temperature is substantial, and therefore, the difference in temperature between points P and Q becomes substantial as the prints count increases. Therefore, the amount by which point P decreases in temperature becomes substantial.

Regarding the heat transfer to a sheet of recording paper on which an unfixed toner image is present, the heat is transferred from the surface of the heater, which has heat generating elements (surface to which point P belongs), to the sheet through the fixation film. Therefore, it is possible that as the surface (surface to which point P belongs) of the heater, which has the heat generating elements, reduces in temperature, an image forming apparatus will be caused to output images which are low in quality, for example, images suffering from fixation failure.

SUMMARY OF THE INVENTION

The present invention is made in consideration of the above described issues. Thus, the primary object of the present invention is to provide an image forming apparatus which does not output images, which suffer from unsatisfactory fixation, even when it is used for an image forming operation in which images are continuously formed on a substantial number of small sheets of recording medium.

According to an aspect of the present invention, there is provided an image forming apparatus comprising a fixing portion for heating and fixing an unfixed image formed on a recording material, said fixing portion including a heater having a heat generating element a substrate, a heat leveling member contacting said heater and having a thermal conductivity higher than that of the substrate, and a temperature detecting member for detecting a temperature of said heat leveling member; a controller for controlling electric power supplied to said heater so that a detected temperature of said temperature detecting member maintains a target temperature, wherein a period in which said controller raises the target temperature with increase of a number of the recording materials is provided in a period in which recording materials having widths smaller a width of maximum size recording material usable with said device are continuously subjected to fixing operations.

According to another aspect of the present invention, there is provided an image forming apparatus comprising a fixing portion for heating and fixing an unfixed image formed on a recording material, said fixing portion including a fixing film, a heater having a heat generating element on a substrate, a heat leveling member having a thermal conductivity higher than that of the substrate and sandwiched between said fixing film and said heater, a temperature detecting member for detecting a temperature of said heater; a controller for controlling electric power supplied to said heater so that a detected temperature of said temperature detecting member maintains a target temperature, wherein a period in which said controller lowers the target temperature with increase of a number of the recording materials is provided in a period in which recording materials having widths smaller a width of maximum size recording material usable with said device are continuously subjected to fixing operations.

Further features of the present invention will become apparent from the following description of exemplary embodiments (with reference to the attached drawings).

BRIEF DESCRIPTION OF THE DRAWINGS

FIGS. 6A and 6B are tables of the target temperature levels for controlling the heater in temperature, in the first to fifth embodiments.

FIGS. 7A-7F are temperature adjustment tables, in the first and fifth embodiments.

FIGS. 11A-11F are temperature adjustment tables, in the second embodiment.

FIGS. 15A-15F are heater temperature adjustment tables, in the third and fourth embodiments.

FIG. 20 is a drawing for showing the thermal resistance of the heater, and describes the problems that conventional fixing devices suffer from.

DESCRIPTION OF THE EMBODIMENTS

Embodiment 1

Figure 23:
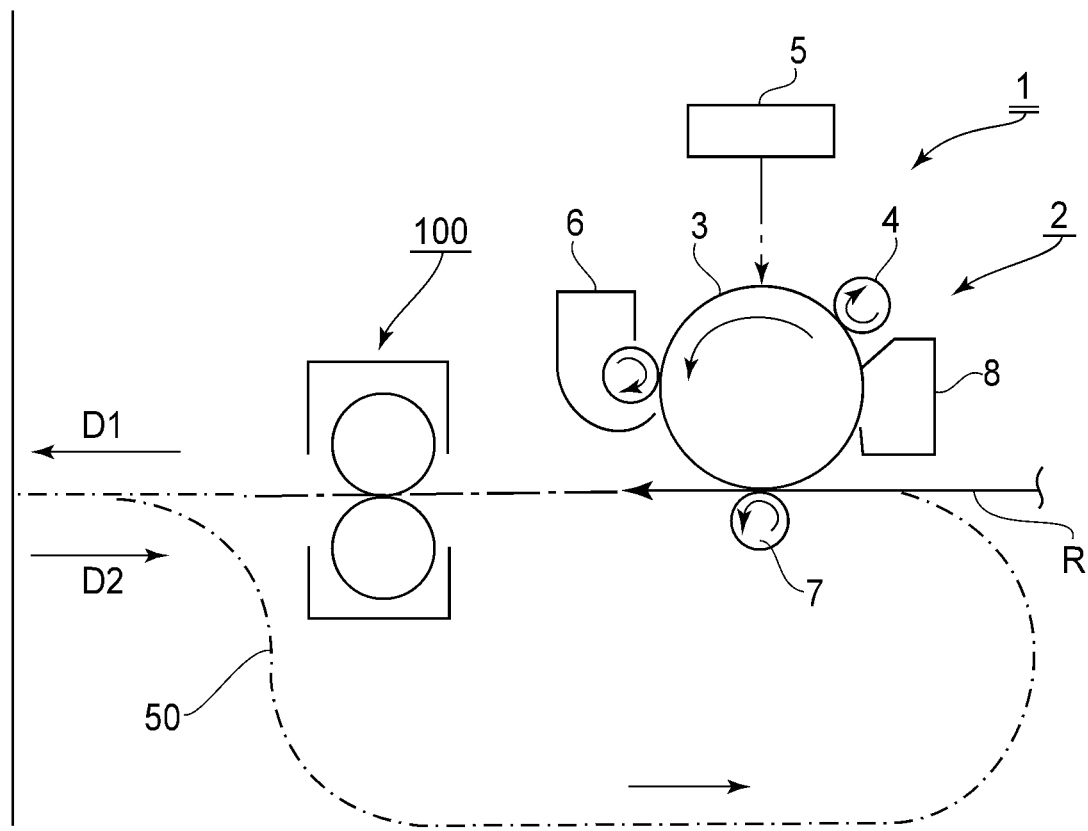
FIG. 23 is a schematic sectional view of one of the typical image forming apparatuses to which the present invention is applicable.

FIG. 23 is a schematic drawing of an example of typical image forming apparatuses. This image forming apparatus 1, shown in FIG. 23, has an image formation section 2 as a means for forming an unfixed toner image on a sheet R of recording medium (which hereafter may be referred to as "recording paper" or simply as "paper") and a fixing device 100 (image heating device) as a fixing means for fixing the toner image. The image formation section 2 has an electrophotographic photosensitive drum 3 which is rotationally driven in the direction indicated by an arrow mark. In an image forming operation, an unfixed toner image is formed on the peripheral surface of the drum 3 by a combination of a charging device 4, a drum exposing device 5, and a developing device 6, which are drum processing means.

After the formation of the toner image on the drum 3, the toner image is transferred by a transferring device 7 onto a sheet of recording paper conveyed from a sheet feeding section (unshown). After being conveyed through the transferring device 7, the sheet R of recording paper is separated from the drum 3, and it is then conveyed to the fixing device 100, which applies heat and pressure to the sheet R and the unfixed toner image thereon. Thus, the unfixed toner image is permanently fixed to the sheet R. After being conveyed out of the fixing device 100, the sheet R is discharged as a finished print from the image forming apparatus 1. After the separation of the sheet R from the drum 3, the drum 3 is cleaned by a cleaning device 8 across its peripheral surface, and is used for the formation of the next image. That is, the peripheral surface of the drum 3 is repeatedly used for image formation. A numerical referential code 50 stands for the recording medium conveyance passage, which is used when the image forming apparatus 1 is in the two-sided printing mode. As the image forming apparatus 1 is put in the two-sided printing mode, the sheet R is conveyed as follows. That is, as a sheet R of recording paper is conveyed through the fixing device 100 after the fixation of a toner image to one of the two surfaces of the sheet R, the sheet R is conveyed in the direction indicated by an arrow mark D1 by a certain distance, and then, is changed in direction so that it is conveyed in the direction indicated by an arrow mark D2. Then, it is conveyed through the recording medium conveyance passage 50 so that an image can be formed on the second surface of the sheet R.

Figure 2:
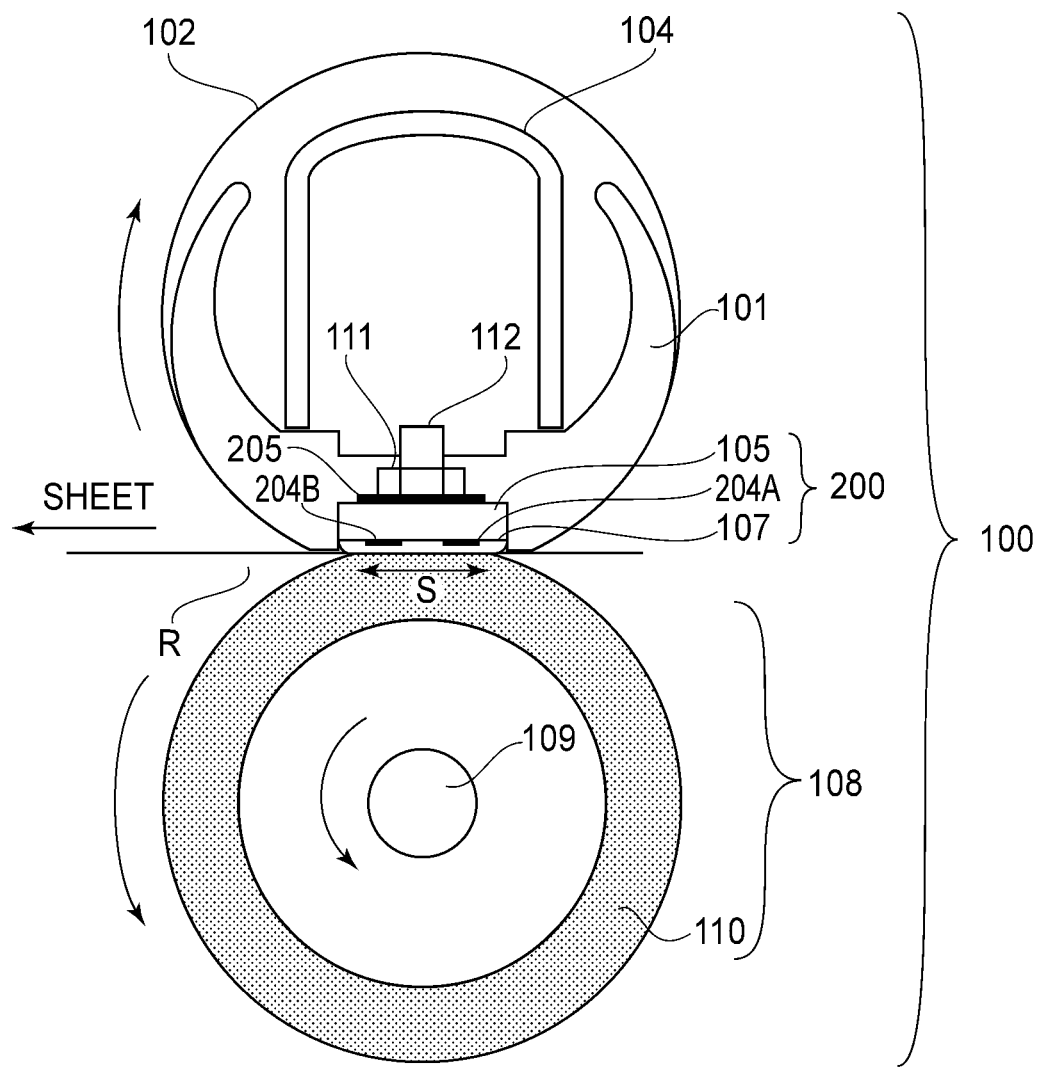
FIG. 2 is a sectional view of the fixing device in the first and fourth embodiments of the present invention.

FIG. 2 is a schematic sectional view of the fixing device 100 in this embodiment. The fixing device 100 has a cylindrical flexible film 102 (movable member), and a heater 200 which is in contact with the inward surface of the cylindrical film 102. It has a pressure roller 108 (nip forming member) which forms a fixation nip S between itself and film 102 by being pressed against the heater 200 with the placement of the film 102 between itself and the heater 200.

The heater 200 is held by a holding member 101, which is made of heat resistant resin. The holding member 101 has a guiding function of guiding the film 102 as the film 102 is circularly moved. Referential code 104 stands for a metallic stay, which is for applying the pressure generated by unshown springs, to the holding member 101.

As the fixation film 102, single-layer film, or multilayer film made of PI (polyamide, PFA (tetrafluoroethyleneperfluoroalkyl vinyl ether copolymer) and coating, multilayer film made of SUS (stainless steel) film and rubber coating is used. The pressure roller 108 is an elastic roller which has a metallic core 109 formed of iron, aluminum, or the like, and an elastic layer 110 formed of silicone rubber or the like. The pressure roller 108 and heater 200 are kept pressed against each other, with the placement of the fixation film 102 between the roller 108 and heater 200. The area designated by referential code S is the fixation nip, which is formed as the pressure roller 108 and heater 200 are pressed against each other.

The pressure roller 108 is rotationally driven by a fixation device driving motor (unshown) at a preset peripheral velocity. As the pressure roller 108 is rotationally driven, friction is generated between the peripheral surface of the pressure roller 108 and the outward surface of the fixation film 102, in the fixation nip S. Thus, the fixation film 102 is rotationally (circularly) driven by the friction, sliding on the heater 200 and remaining in contact with the heater 200. While the fixation film 102 is rotationally driven, the holding member 101 functions as a guiding member for guiding the fixation film 102 by the inward surface of the fixation film 102, making it easier for the fixation film 102 to be rotationally driven.

The fixing device 100 is provided with a temperature detection element 111, such as a thermistor, which is kept in contact with the surface of the heater 200, which does not contact the fixation film 102. Hereafter, this surface of the heater 200 will be referred to as "nip-less surface". More concretely, the temperature detection element 111 is in contact with the portion of the surface of the heater 200, which does not contact the fixation film 102, and is within the path of the narrowest sheet of recording paper (smallest sheet in terms of lengthwise direction of heater 200), in the image forming apparatus 1. The temperature detection element 111 detects the temperature of the nip-less surface of the heater 200. The electric power to be applied to the heater 200 from a commercial AC power source is controlled based on the temperature information detected by the temperature detection element 111.

Here, the surface of the heater 200, by which the heater 200 heats a sheet R of recording paper, that is, the surface which forms the nip, will be referred to as the first surface of the heater 200, whereas the nip-less surface of the heater 200, the temperature of which is detected by the temperature detection element 111, will be referred to as the second surface of the heater 200.

The fixing device 100 is also provided with a protection element 112 such as a thermo-switch or thermo-fuse, or the like, which reacts to shut off the electric power supply to the heater 200 as the temperature of the heater 200 becomes excessively high. It is also with the nip-less surface of the heater 200 that the protection element 112 is in contact. The protection element 112 is also in contact with the portion of the nip-less surface of the heater 200, which is within the path of the smallest sheet of recording paper, like the temperature detection element 111.

As the rotation of the fixation film 102, which is caused by the rotation of the pressure roller 108, becomes stable, and the temperature of the heater 200 reaches a preset level (target level), and begins to be kept at the preset level, a sheet R of recording paper, on which an unfixed toner image is present, is introduced into the fixation nip S, from the side where the image formation section 2 (FIG. 23) is present. Then, the sheet R is conveyed through the fixation nip S, along with the fixation film 102, remaining subjected to the pressure (nip pressure). As the sheet R is conveyed through the fixation nip N, the heat from the heater 200 transfers onto the sheet R through the fixation film 102. Thus, the unfixed toner image on the sheet R is fixed to the sheet R.

Figure 3:
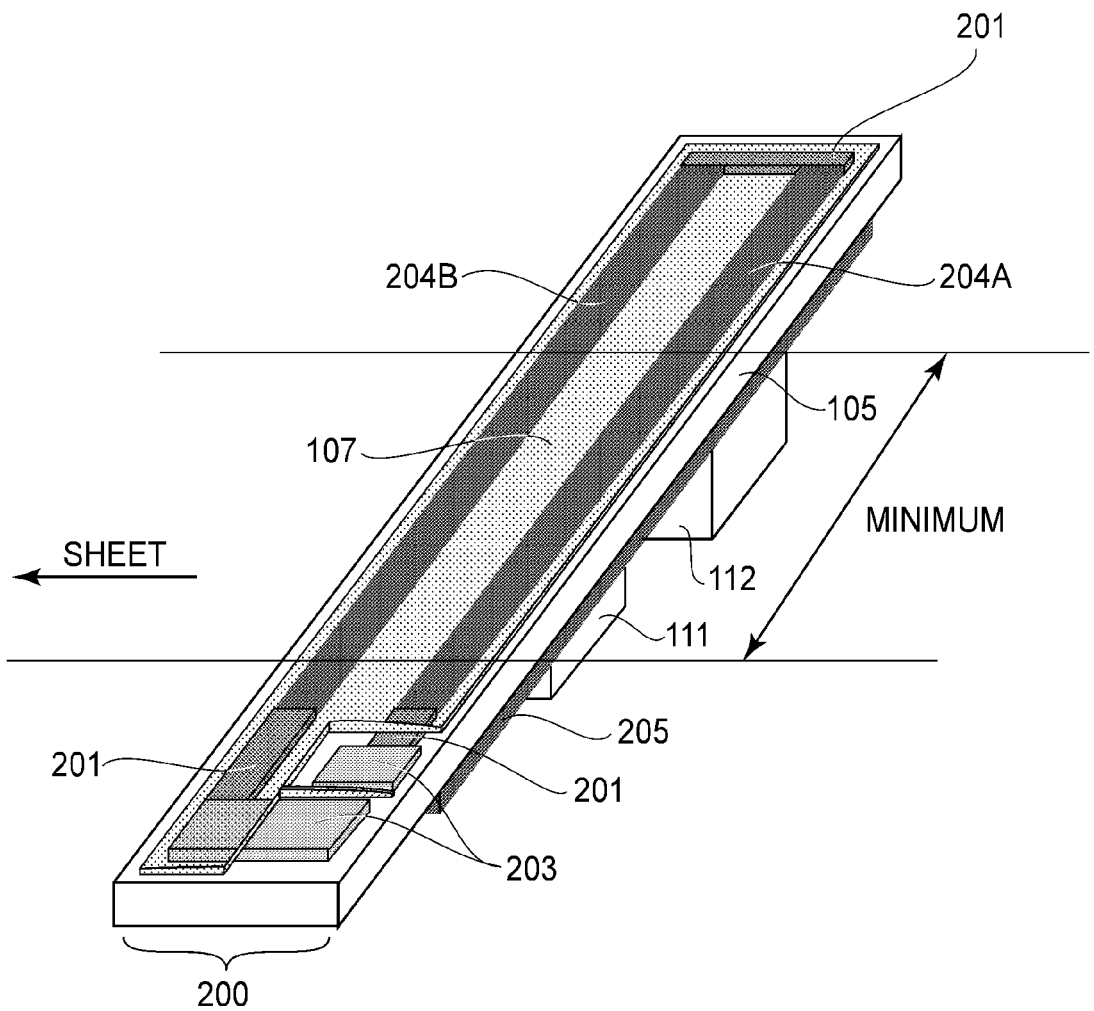
FIG. 3 is a drawing which shows the heater in the first embodiment, and the peripheral components of the heater.

FIG. 3 three-dimensionally shows the heater 200, temperature detection element 111, and protection element 112. The fixing device 100 is structured so that the heater 200 extends in the direction which is perpendicular to the direction in which a sheet R of recording paper is conveyed through the fixing device 100. The heater 200 has a substrate 105, which is a piece of long, narrow, and flat plate formed of ceramic or the like, being therefore high in thermal conductivity. Furthermore, the heater 200 has a pair of heat generating elements 204A and 204B (heat generating resistors which generate heat as electric current is flowed through them), electrically conductive elements 201, contacts 203 (electrodes for power supply), and an overcoat glass 107, which are on the top surface (one of two surfaces of substrates 105).

The heat generating section of the heater 200 comprising two elements 204A and 204B, as described above, which are serially connected to each other through the electrically conductive elements 201. The heat generating elements 204A and 204B are such resistors that generate heat as they are supplied with electric power from a commercial AC power supply. The electrically conductive elements 201 bear a role of keeping the heat generating elements 204A and 204B in contact with each other, and also a role of keeping the heat generating elements 204A and 204B in contact with the contacts 203. It is desired that the electrically conductive elements 201 do not generate heat when the heater 200 is provided with electric power. Therefore, they are designed and manufactured so that they remain low in electrical resistance.

The contact 203 is for providing electrical connection between an unshown connector and heater 200. Thus, electrical power is supplied to the heater from a commercial AC power source through the contact 203. The overcoat glass 107 bears the role of electrically insulating the heat generating elements and conductive members, which is primary in potential level. By the way, in order to allow the contact 203 to have electrical connection to the unshown connector, the overcoat glass 107 does not cover the contact 203, allowing thereby the electrically conductive portion of the contact 203 to remain exposed.

The nip-less surface of the heater 200 has the strip 205 of thermally conductive substance (thermal uniformizing member), which is substantially greater in thermal conductivity $\lambda$ (W/m·K) than the ceramic substrate 105. More specifically, the thermal conductivity $\lambda$ of the ceramic substrate 105 is roughly 25 (W/m·K), whereas the thermal conductivity of the thermally conductive substance is in a range of 300-1,000 (W/m·K). As the strip of thermally conductive substance which is very high in thermal conductivity, a strip of metallic plate made of aluminum, or the like, or a strip of carbon sheet (graphite sheet), may be adhered to the nip-less surface of the heater 200, or the metallic paste made up of silver or the like, or carbon (graphite) paste, may be adhered to the nip-less surface of the substrate 105 by sintering.

The strip 205 of thermally conductive substance (which hereafter may be referred to simply as "heat conduction strip 205") is long, narrow, and flat. As for the external dimension of the heat conduction strip 205, the heat conduction strip 205 is slightly greater than the area of the heater 200, which is occupied by the heat generating elements 204A and 204B, in terms of both the lengthwise and widthwise directions of the fixing device 100. The reason for making the heat conduction strip 205 slightly larger than the area of the surface of the heater 200, which is occupied by the heat generating elements 204A and 204B, is for ensuring that the heat conduction strip 205 overlaps with the area of the surface of the heater 200, which is occupied by the heat generating elements 204A and 204B, in terms of the direction perpendicular to the first and second surfaces of the heater 200, even in consideration of the tolerance for the attachment of the heat conduction strip 205 to the heater 200. By the way, all that is required of the heat conduction strip 205 in terms of dimension is that its extends from the position of the temperature detection element 111 to the area of the recording medium passage, which becomes the out-of-sheet-path portion of the recording medium passage when the smallest sheet of recording paper, which is usable with the image forming apparatus 1, is used as recording medium.

Regarding the following description of this embodiment, it is assumed that the reason why the temperature of the first surface of the heater 200 becomes different from that of the second surface of the heater 200 is that the fixing device 100 is structured as follows. That is, a part or the entirety of the first or second surface of the heater 200 is covered with a strip of carbon (graphite) paste, which is higher in thermal conductivity than the substrate 105, or a part or the entirety of the first or second surface of the heater 200 is covered with a metallic component, or metallic paste, which is higher in thermal conductivity than the substrate 105.

The temperature detection element 111 and the protection element 112 are placed in contact with the thermally conductive substance (heat conduction strip 205) on the nip-less surface of the heater 200. Incidentally, the temperature detection element 111 and protection element 112 may be placed directly in contact with the thermal conductive substance, or indirectly, with the placement of thermally conductive grease, adhesive, and/or the like.

Figure 4A:
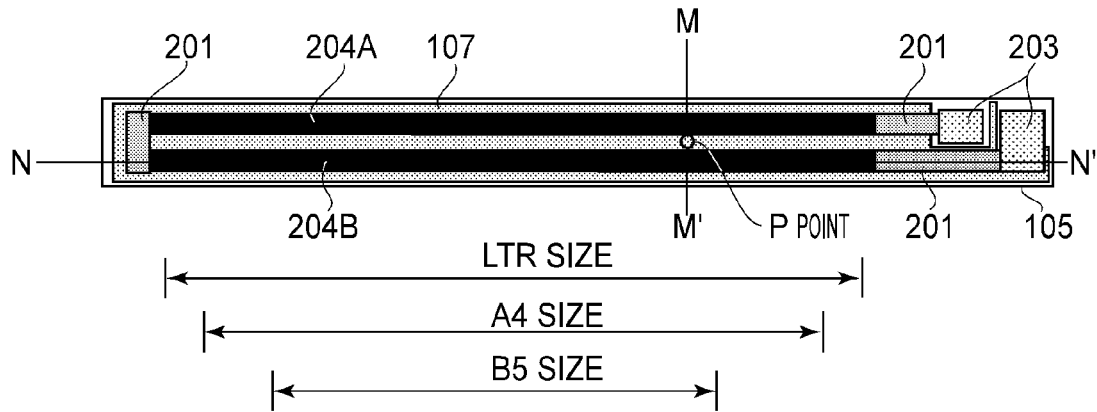
FIGS. 4A, 4B and 4C are drawings for describing the heater, and its peripheral components, in the first embodiment, and also, for describing the problems from which conventional fixing devices suffer.
Figure 4B:
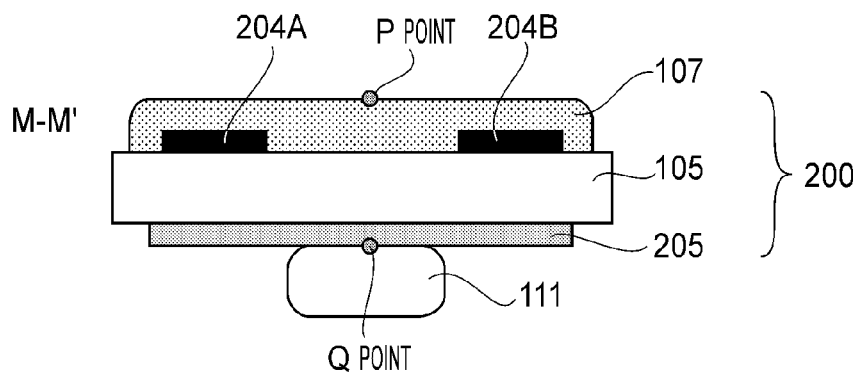
Figure 4C:
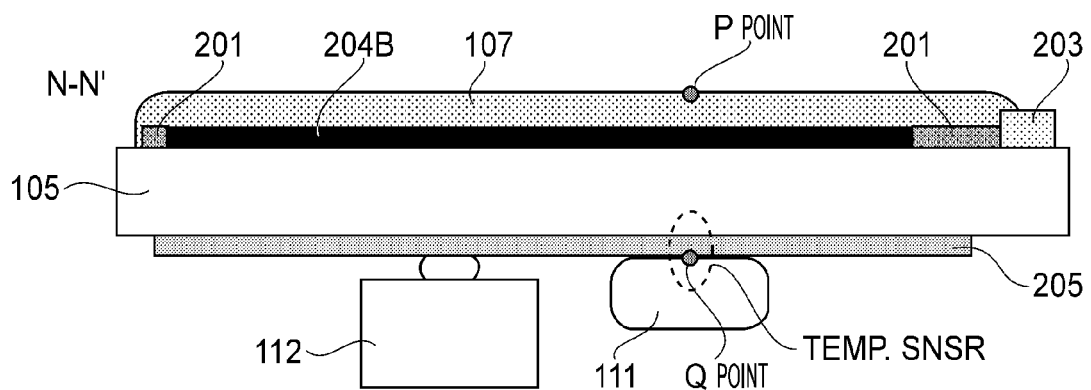

FIG. 4 is two-dimensionally shows the structure of the heater 200, temperature detection element 111, and protection element 112. FIG. 4A is a plan view of the heater 200, as seen from the side where the overcoat glass 107 is present. FIG. 4B is a sectional view of the heater 200, at a plane M-M' in FIG. 4A. FIG. 4C is a sectional view of the heater 200 at a plane N-N' in FIG. 4A. The detailed description of the heater 200 with reference to FIG. 4 will be the same as the detailed description of the heater 200 with reference to FIG. 3, and is therefore not given. By the way, point Q is on the nip-less surface of the heater 200, and is in the temperature detection range, whereas point P is on the nip forming surface of the heater 200, and corresponds in position to point Q.

Figure 5:
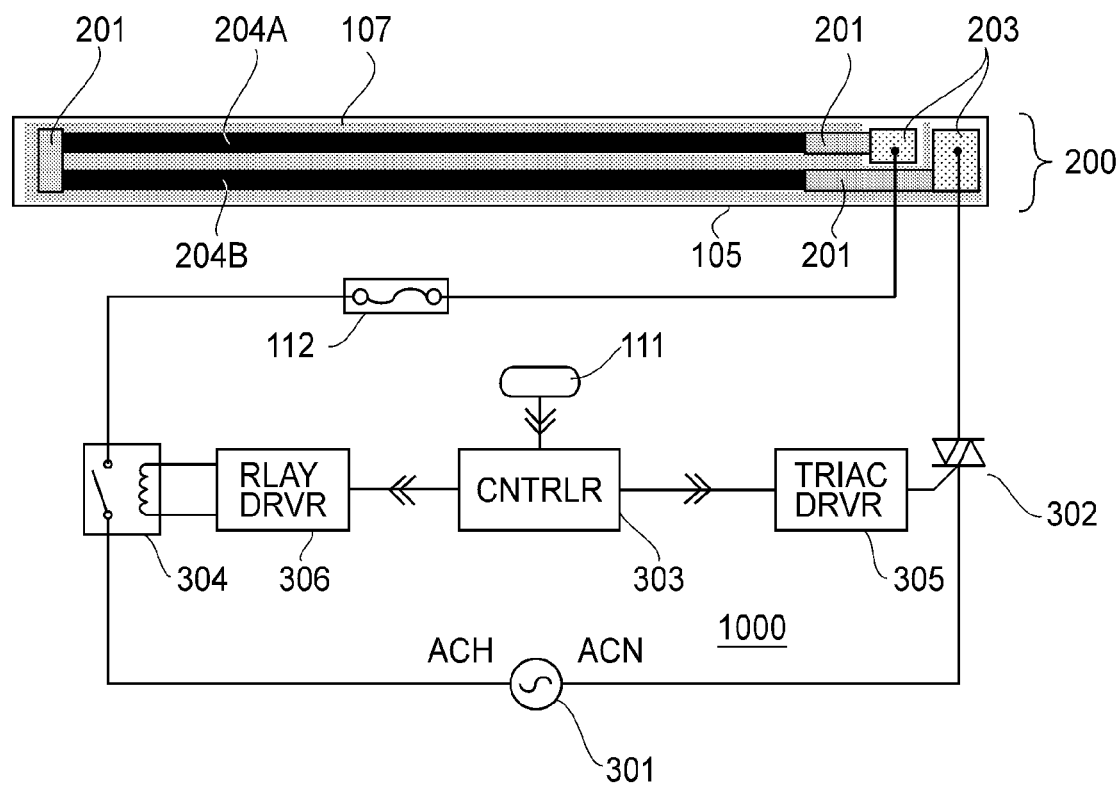
FIG. 5 is a drawing of the circuit for supplying the heater with electrical power, in the first and fifth embodiments.

FIG. 5 shows the heater 200, and a power supply circuit 1000 (heater controlling device). The ACH terminal of the commercial AC power source 301 (means for supplying heat generating resistors 204A and 204B with electric power) is in connection to one of the heater contacts 203, through a relay 304 and protection element 112. The other contact 203 of the heater 200 is in contact with the ACN terminal of the commercial AC power source 201, through a Triac 302. The temperature of the nip-less surface of the heater 200 is detected by the temperature detection element 111 (temperature detecting means), and the detected temperature is inputted, in the form of voltage, into a controller 303 (controlling means).

After the voltage is inputted into the controller 303, it is converted into a digital signal (A/D conversion), and compared with the value in a target temperature table stored in advance in the storage section of the controller 303. If the temperature information inputted into the controller 303 from the temperature detection element 111 is no more than a target temperature, the controller 303 controls the Triac 302 so that the amount by which electrical power is given to the heater 200 increases.

On the other hand, if the temperature information inputted into the controller 303 is higher than the target temperature, the controller 303 controls the Triac 302 so that the amount by which the heater 203 is provided with electrical power reduces. The control signal outputted from the controller 303 is given to the Triac 302 through a Triac driving section 305. As described above, the controller 303 controls the electrical power, which is to be supplied to the heater 200, in such a manner, that the temperature detected by the temperature detection element 111 remains at the target level.

Next, how the heater 200 is controlled in temperature will be described. FIG. 6 is an example of a target temperature table for controlling the temperature of the heater 200 in a case where the nip-less surface the heater 200 is not provided with the heat conduction strip 205. The target temperature table for the one-sided printing operation (FIG. 6A) is different from the target temperature table for two-sided printing operation (FIG. 6B).

The target temperature table for the one-sided printing operation is organized based on the print count (cumulative length of time a sheet of recording paper is in fixation nip S), and sheet interval (interval between consecutively conveyed two sheets R). As the print count increases, the target temperature is downwardly adjusted for the following reason. That is, as the print count increases, the heater 200, fixation film 102, pressure roller 108, holding member 101, stay 104, etc., will increase in the amount of the heat therein. Therefore, even if the target temperature is downwardly adjusted compared to when the print count is smaller, a sheet R of recording paper can be provided with a sufficient amount of heat for fixation. Further, while a sheet R of recording paper is conveyed through the fixation nip S, the sheet R robs heat from the fixation nip S. However, heat is not robbed from the fixation nip S during sheet intervals. Therefore, the target temperature for sheet interval is set slightly lower than the target temperature for the periods in which a sheet R of recording paper is conveyed through the fixation nip S.

In the case of one-sided printing operation, the target temperature is switched between the one for sheet conveyance period and the one for sheet interval, with reference to the target temperature adjustment table in FIG. 6, as sheets R of recording paper are conveyed through the image forming apparatus 1.

In the case of a two-sided printing operation, the target temperature for the second surface of a sheet R of recording paper (surface of sheet R, on which an image is formed, and to which an image is fixed, after an image is formed on the first surface of sheet R, in a two-sided printing operation), is made different from the target temperature for the first surface (surface of sheet R, on which image is formed first, and to which an image is fixed first). Even after the image on the second surface of the sheet R is fixed, the sheet R retains a certain amount of heat which was stored while the image on the first surface was fixed. Therefore, even if the target temperature for the second surface is set lower than that for the first surface, it is possible to supply sheet R with the necessary amount of heat for proper fixation. Further, the target temperature for the sheet interval between the image fixation on the first surface of a given sheet R of recording paper and the image fixation on the second surface of the same sheet R is made different from the target temperature for the sheet interval between the consecutive two sheets R of recording paper.

A two-sided printing operation has a longer sheet interval than a one-sided printing operation. Therefore, the target temperature for the sheet interval of a two-sided printing operation is set substantially lower than that for a one-sided printing operation, for the following reason. During a sheet interval, there is no sheet of paper which robs heat from the fixation nip S, in the fixation nip S. Therefore, the target temperature for the sheet interval is the same as that set for the period in which sheet R is conveyed through the fixation nip S. Thus, the fixation nip S becomes excessively high in temperature. In addition, in a two-sided printing operation, there is a provided a period called the "startup period", before a sheet R of recording paper is introduced into the fixation nip S to form an image on its second surface (target temperature for this period is set higher than those for the sheet intervals 1 and 2, and lower than the target temperatures for the first and second surfaces), to raise in advance the temperature of the fixation nip S so that, by the time a sheet R of recording paper enters the fixation nip S for the fixation of an image on its second surface, the fixation nip S will not become too low in temperature.

Also in a two-sided printing operation, the heater 200 is controlled in temperature in such a manner that as a sheet R of recording paper is conveyed through the image forming apparatus 1, the target temperature is changed according to the state of the fixing device 100, that is, sheet pass 1→sheet interval 1→startup period→sheet pass 2→sheet interval 2→startup period→sheet pass 1→ . . . , with reference to the target temperature table in FIG. 6.

By the way, according to the target temperature table in FIG. 6, the target temperatures are organized according to recording paper size, that is, whether a sheet R recording paper used for image formation is of the LETTER size, A4 size, LEGAL size, or B5 size. In terms of recording medium selection, this table is limited for convenience sake. However, this embodiment is not intended to limit the present invention in terms of recording medium selection. Furthermore, there are cases in which a target temperature table is organized so that the target temperature can be changed according to the ambient temperature of the image forming apparatus 1 (environment temperature). In this embodiment, however, such a table is not provided for the sake of simplification.

Up to this point, the temperature control for the fixing device 100 was described with reference to a case in which the fixing device 100 did not have the heat conduction strip 205 on the nip-less surface of its heater 203. Hereinafter, the temperature control for a case in which the fixing device 100 has the heat conduction strip 205 on the nip-less surface of its heater 200 is described.

In this embodiment, the fixing device 100 which has the heat conduction strip 205 on the nip-less surface of its heater 203 is controlled in temperature, based on the target temperature adjustment table shown in FIG. 7. According to the adjustment table in FIG. 7, the heater temperature is adjusted according to whether the image forming apparatus 1 is in the one-sided printing mode or two-sided printing mode, and also, according to a recording paper size. By the way, the largest sheet of recording paper (in terms of lengthwise direction of heater 200) usable with the image forming apparatus 1 in this embodiment is of LETTER size and LEGAL size.

The adjustment table for the one-sided printing operation which uses the sheet R of recording paper of LETTER size or LEGAL size is given in FIG. 7A. The adjustment table for the one-sided printing operation which uses a sheet R of recording paper of A4 size is given in FIG. 7B. The adjustment table for the one-sided printing operation which uses a sheet R of recording paper of B5 size is given in FIG. 7C. The adjustment table for the two-sided printing operation which uses a sheet R of recording paper of LETTER size or LEGAL size is given in FIG. 7D. The adjustment table for the two-sided printing operation which uses a sheet R of recording paper of A4 size is given in FIG. 7E. The adjustment table for the two-sided printing operation which uses a sheet of R of recording paper of B5 size is given in FIG. 7F.

As for the reason why the adjustment table is switched according to paper size, paper width corresponds to paper size, and the recording medium (sheet) path corresponds to the paper width (size). Therefore, the size of the out-of-sheet-path area, and the temperature of the out-of-sheet-path area, are affected by the recording medium (sheet) size. For example, a sheet of recording paper of LETTER size is roughly 216 mm in width, and a sheet of recording paper of B5 size is roughly 182 mm in width. Assuming here that the heat generating elements 204A and 204B are 220 mm in length, in the case of a sheet of recording paper of LETTER size, a pair of out-of-sheet-path areas which are 2 mm in length occur across the lengthwise end portions of the fixing device 100, and undesirably increase in temperature, whereas in the case of a sheet of recording paper of size B5, a pair of out-of-sheet-path areas which are 19 mm in length occur across the lengthwise end portions of the fixing device 100, and undesirably increase in temperature.

In the case of a sheet of paper of B5 size, the out-of-sheet-path area, which undesirably increases in temperature, is wider, becoming therefore higher in temperature, than in the case of a sheet of paper of LETTER size. Therefore, in the case of a sheet of paper of B5 size, the amount by which heat is transferred to point Q from the out-of-sheet-path areas increases, and therefore, the greater in the temperature difference between points P and Q, than in the case of a sheet of paper of LETTER size. For this reason, the adjustment value for the sheet of paper of size B5 is greater than that for a sheet of paper of LETTER size.

In all of FIGS. 7A-7F, the adjustment values are set so that as the print count increases in a continuous printing operation, the adjustment value is increased, for the following reason: that is, as the print count increases, the difference in temperature between points P and Q increases (point P is lower in temperature than point Q). Therefore, it is necessary to increase the adjustment value to compensate for the temperature difference between points P and Q. In order to keep the temperature of point P at a desired level, the print count at which the adjustment value is changed is set according to paper size and printing mode (one-sided or two-sided).

Furthermore, the greater the recording paper in basis weight (weight of recording paper per unit area), the greater the amount by which heat has to be given to the recording paper, and therefore, the higher the out-of-sheet-path portions become in temperature. In the case of the adjustment table, in this embodiment, given in FIG. 7, only the recording paper width is taken into consideration; the basis weight of the recording paper is not taken into consideration, for the sake of simplification of the table.

The target temperature for the heater temperature control is set based on the sum of the target temperature given in FIG. 6, and the values in the adjustment table given in FIG. 7. For example, in a case where paper size is B5, printing mode is two-sided, and the 45th sheet of paper is to be conveyed through the image forming apparatus 1, the target temperature is 232° C., which is the sum of the 220° C. in FIG. 6B and +12° C. in the adjustment table in FIG. 7F.

Figure 24A:
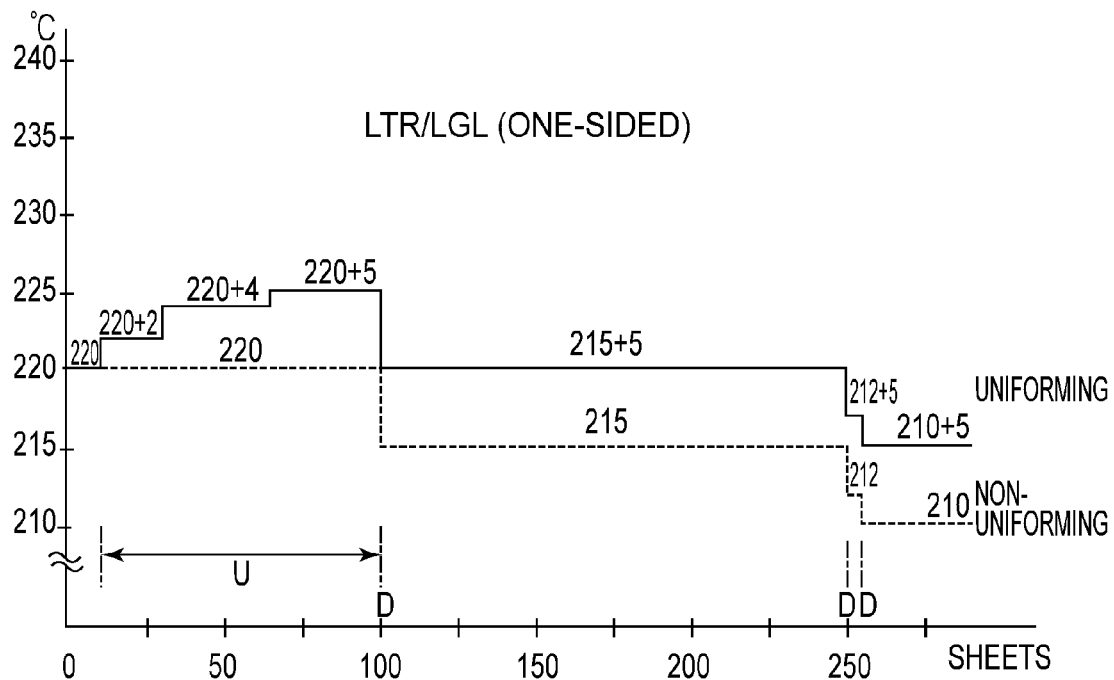
FIGS. 24A and 24B are graphs which show the changes in the target temperature, in the first embodiment (one-sided print mode).
Figure 24B:
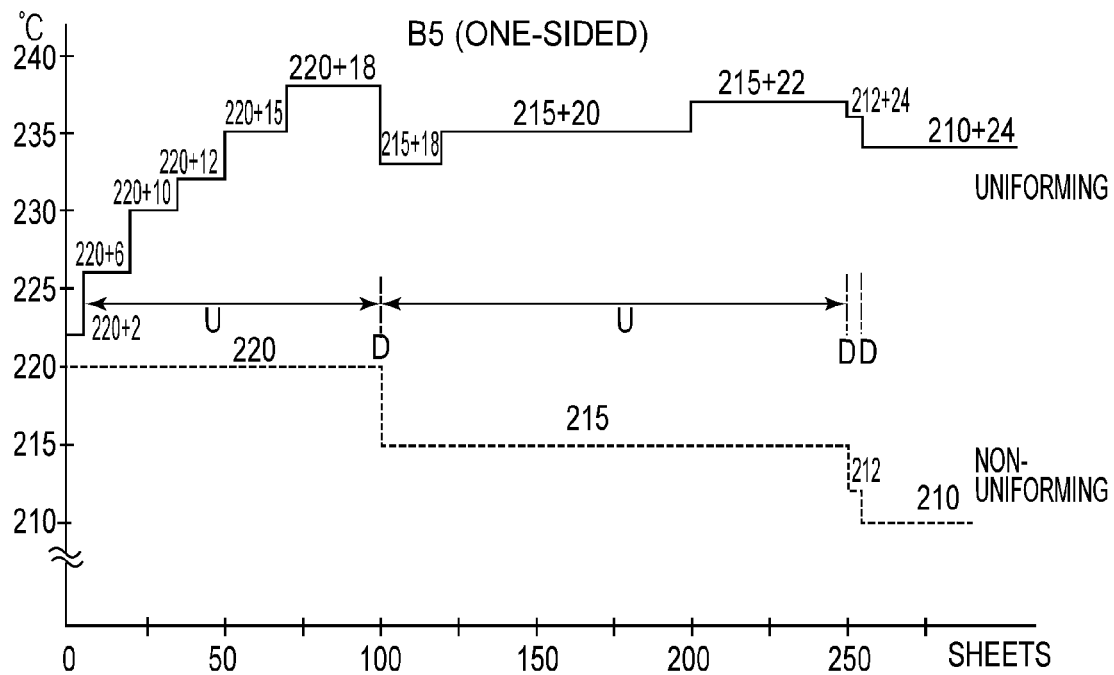

FIG. 24A shows the changes caused to the target temperature in the one-sided printing operation in which the recording medium is of LETTER size or LEGAL size, and FIG. 24B shows the manner in which the target temperature is changed in the one-sided printing operation in which the recording medium is of B5 size. The horizontal axis represents the print count in the continuous printing operation, and the vertical axis represents the temperature.

In both FIGS. 24A and 24B, the broken line represents the temperature changes which corresponds to FIG. 6A (that is, temperature table for case in which heater has no heat conduction strip 205). Furthermore, the solid line in FIG. 24A represents the manner in which the target temperature changed (that is, in the case where heater 200 is provided with heat conduction strip 205 (temperature uniformizing member 39)). Furthermore, the solid line in FIG. 24B represents the manner in which the target temperature changed as the temperature in FIG. 6A was adjusted by the temperature in FIG. 7C.

Figure 25A:
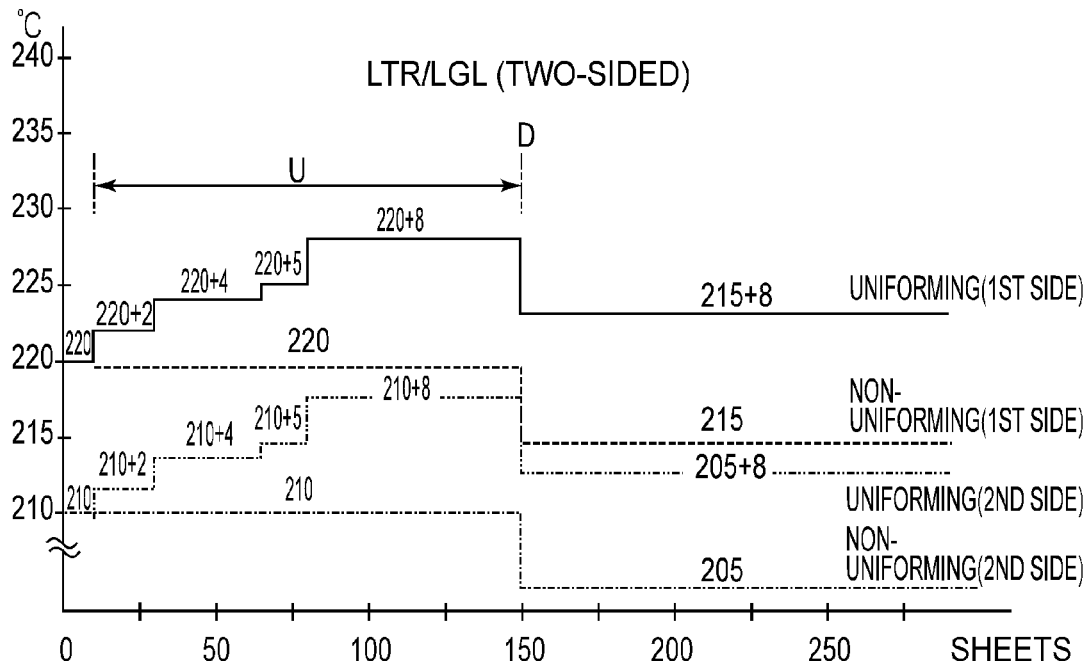
FIGS. 25A and 25B are graphs which show the changes in the target temperature, in the first embodiment (two-sided print mode).
Figure 25B:
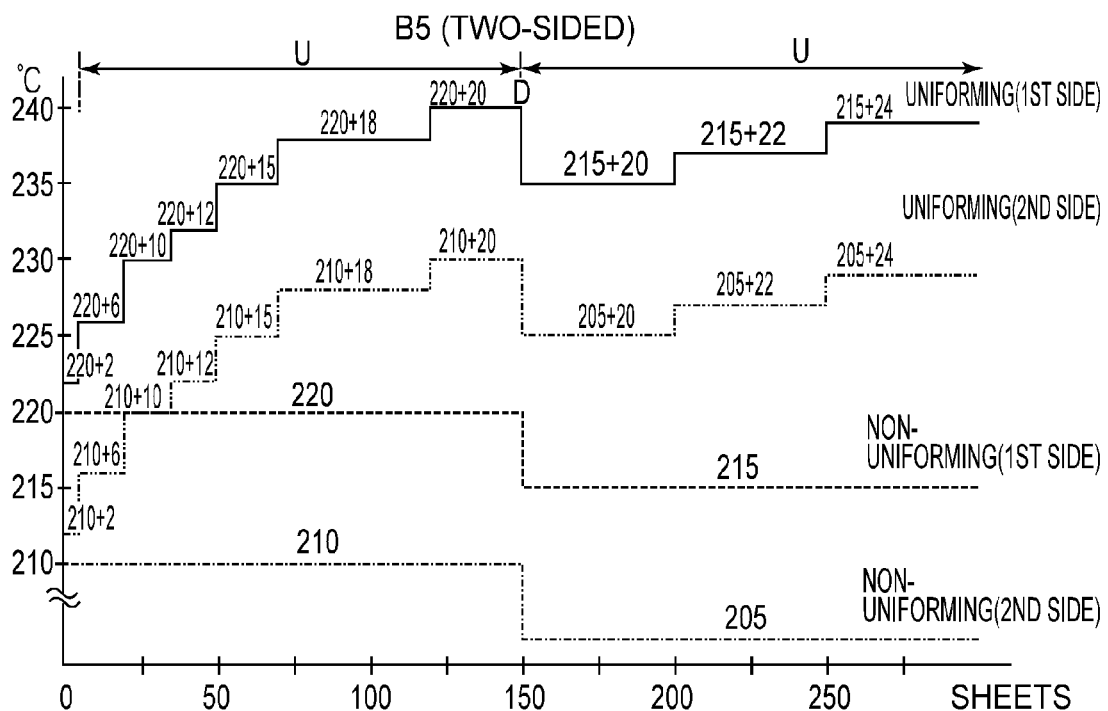

Similarly, FIG. 25A shows the manner in which the target temperature was changed in the two-sided printing operation which used sheets of recording paper of LETTER size or LEGAL size, and FIG. 25B shows the changes in target temperature in the two-sided printing operation which used sheets of recording paper of B5 size.

As will be understandable from these tables, in the case where the apparatus, in this embodiment, is provided with the heat uniformizing member, the image forming operation in which a substantial number of sheets of recording medium which are smaller in width than the largest sheet of recording medium which is usable with the image forming apparatus 1, are continuously subjected to the fixing process, is provided with a period U in which the control section 303 increases the target temperature as the print count increases.

Furthermore, this image forming operation is provided with a timing (D), with which the control section 303 reduces the target temperature.

By the way, in the case of the apparatus in this embodiment, the image forming operation in which images are continuously formed on a substantial number of sheets of recording medium of LETTER size or LEGAL size is also provided with the period (U), for the following reason: that is, as described above, the heat generating element in this embodiment is 220 mm in length, and is therefore longer by 4 mm than the largest sheet of recording paper. Thus, the out-of-sheet-path areas occur even when the largest sheet of paper is subjected to the fixation process. However, in the case of a fixing device designed so that the length of its heat generating component becomes equal to, or only slightly greater than, the width of the largest sheet of paper usable with the device, it is not mandatory to provide the period (U), in which the target temperature is increased during a period in which a substantial number of the largest sheets of recording paper are continuously processed for image fixation. In essence, all that is necessary is that at least one period (U) in which the target temperature is increased is provided during a period in which a substantial number of small sheets of recording paper are continuously processed for image fixation.

Figure 1:
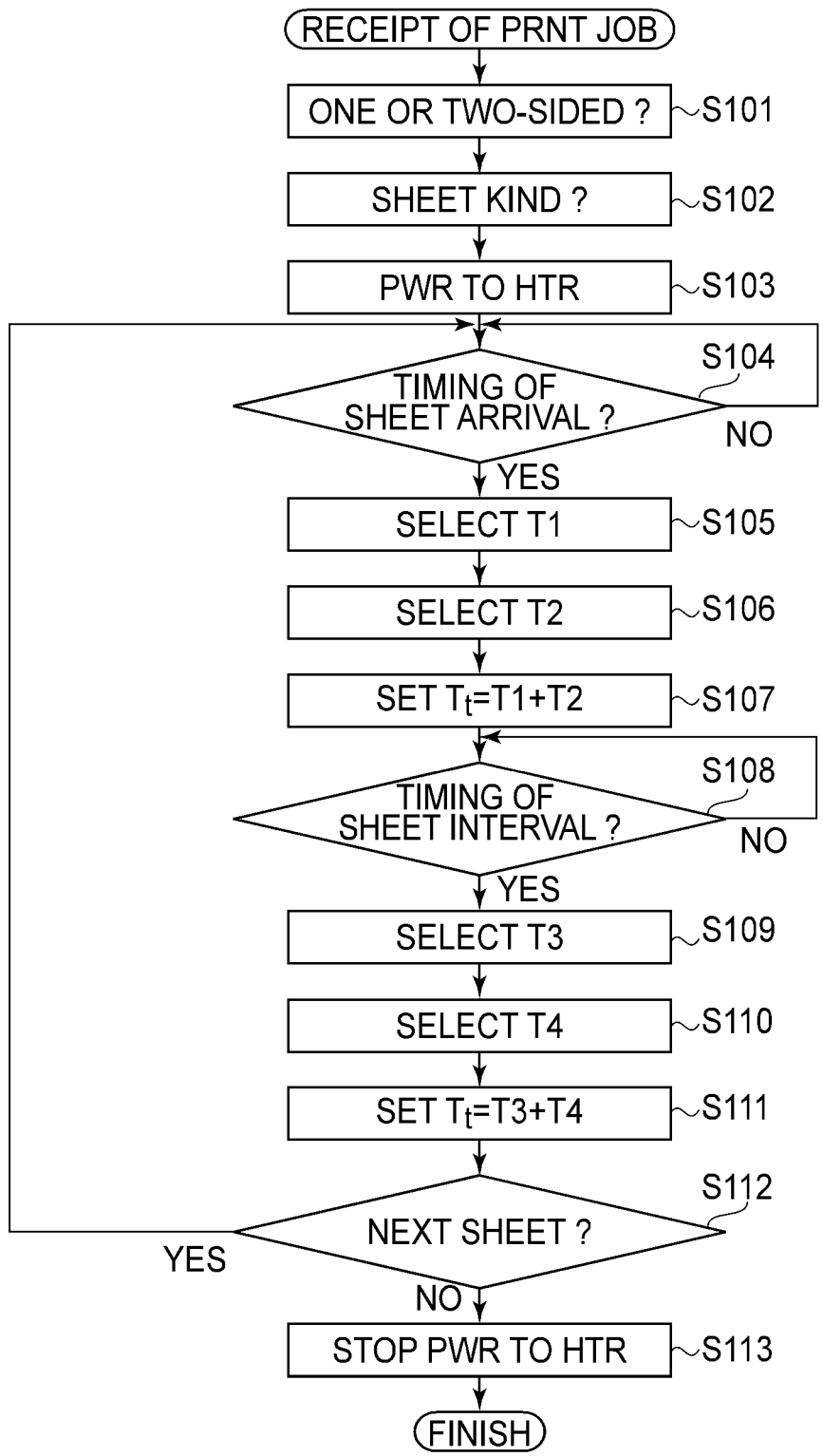
FIG. 1 is the best drawing for describing the present invention.

FIG. 1 shows the flowchart of the temperature control in this embodiment. Here, the temperature control is described with reference to the one-sided printing operation. As the image forming apparatus 100 receives a printing job, it determines the mode (one-sided or two-sided) in which it is to be operated (S101), and it will then determine the recording medium type (S102). It then starts up its fixing device based on the preset startup sequence (S103).

Thereafter, it determines the timing with which a sheet R of recording paper enters the fixing device 100, bearing an unfixed toner image (S104). As the controller 303 determines the timing, it selects a temperature control target temperature level T1 for the sheet conveyance period, based on the print count, from the temperature control target temperature table in FIG. 6A, which was stored in advance in its memory section of the controller 303 (S105). Furthermore, it selects an adjustment value T2 for the recording medium conveyance period according to paper size and print count, from the adjustment tables in FIGS. 7A-7C, which were stored in advance in the memory section of the controller 303 (S106).

Then, the controller 303 sets a sum Tt of the selected T1 and T2, as the target temperature for the period in which a sheet R of recording paper is moved through the fixing device 100 (S107), and controls the Triac 302. As the timing comes with which the sheet R of recording paper, which is being conveyed through the fixing device 100, is conveyed out of the fixing device 100 (S108), the controller 303 selects a target temperature level T3 for the sheet interval, according to the print count, from the target temperature table in FIG. 6A (S109).

Then, the controller 303 selects an adjustment value T4 for the sheet interval, based on the sheet size and print count, from the adjustment tables in FIGS. 7A-7C (S110). Then, the controller 303 sets the sum Tt of the selected T3 and T4 as the target temperature for the sheet interval (S111), and controls the Triac 302. Thereafter, if there are more sheet of recording paper to be processed (next sheet R of recording paper is to be subjected to fixation process) (S112), the controller 303 repeats Steps S104-S111 to continue to control the fixing device 100 in temperature. On the other hand, if it determines that there are no more sheets of recording paper to be processed (S112), it stops supplying the heater 203 with electric power, following a preset cease sequence (S113), and ends the printing job.

Figure 8A:
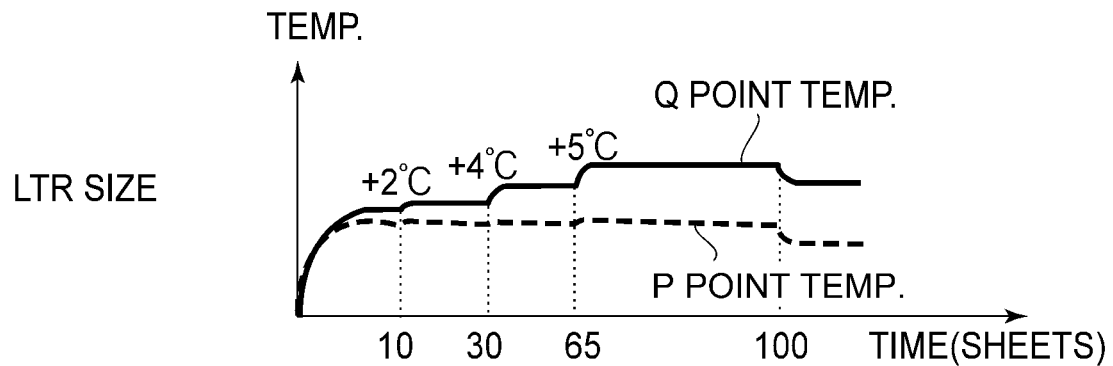
FIGS. 8A and 8B show the results of the heater temperature control method in the first embodiment.
Figure 8B:
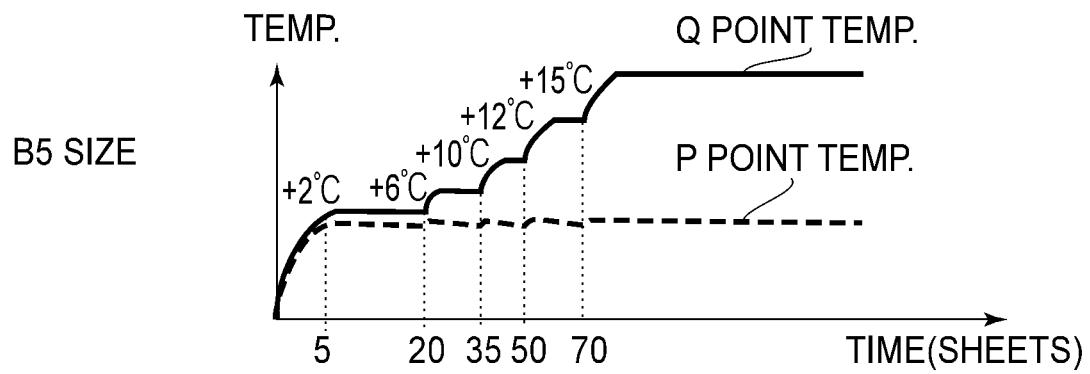
Figure 9A:
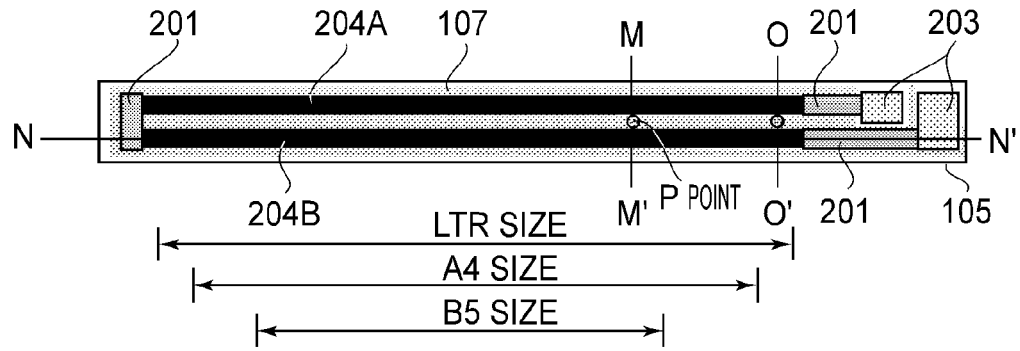
FIGS. 9A-9D are drawings of the heater, and its peripheral components, in the second embodiment.
Figure 9B:
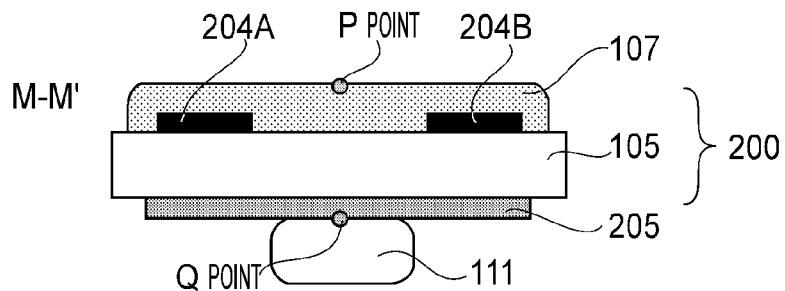
Figure 9C:
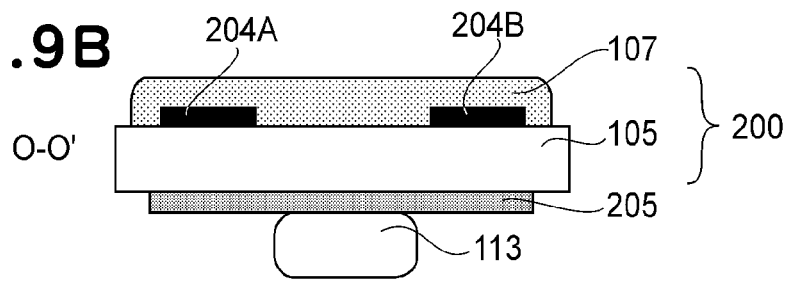
Figure 9D:
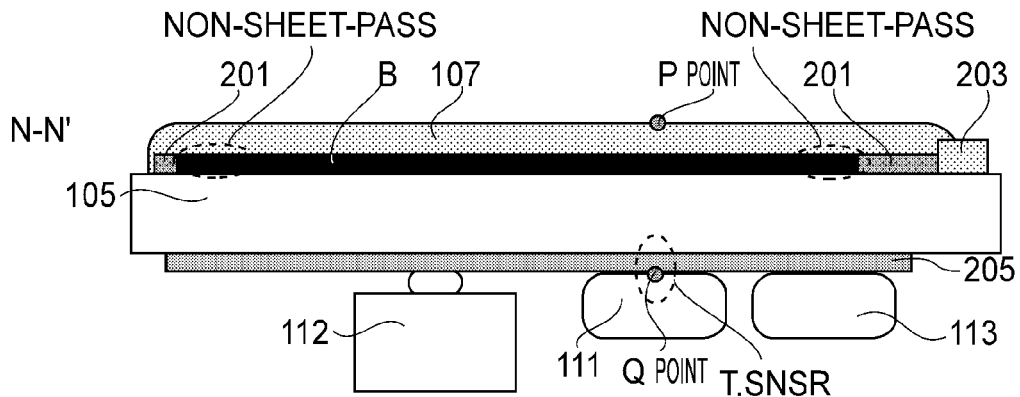

Shown in FIG. 8 are the changes which occurred to the temperature of point P (FIG. 4) and the temperature of point Q (FIG. 4) when the heater 200 having the heat conduction strip 205 on its nip-less surface was controlled in temperature by the temperature controlling method in this embodiment. FIGS. 8A and 8B show the manner in which points P and Q changed in temperature in the one-sided printing operation in which recording mediums were sheets of recording paper of LETTER size or LEGAL size. As is evident from FIG. 8, the temperature of point Q became higher than the temperature of point P because of the heat from the out-of-sheet-path areas, and the presence of the heat conduction strip 205. Since the temperature of the heater 200 is controlled based on the temperature of point Q (feedback control), the temperature of point Q was kept stable at a preset level by adjusting the target temperature level by adding the adjustment values in FIGS. 7A-7C to the temperature of point Q.

Incidentally, if the manner in which the target temperature is switched between the sheet conveyance period and the sheet interval is added to FIG. 7, the drawings become excessively detailed to see. Therefore, the switching is not shown in FIG. 8.

This embodiment is described with reference to the method which uses two tables, which are the target temperature table (FIG. 6) for the case in which the nip-less surface of the heater 200 is not provided with the heat conduction strip 205, and the adjustment table (FIG. 7). However, the heater temperature may be controlled with reference to only one target temperature table created in advance in consideration of the difference between the temperature of point P and the temperature of point Q.

In this embodiment, the target temperature was set to the sum of the target temperature in FIG. 6, and the value in the adjustment table in FIG. 7. By subtracting the temperature in the adjustment table in FIG. 7 from the temperature detected by the temperature detection element 111, and the obtained temperature difference may be used in conjunction with the target temperature table in FIG. 6, to control the heater temperature. The effects of such heater temperature control are the same as those obtainable by the temperature control in this embodiment. Therefore, the adjustment may be made with the use of a method such as this.

By the way, in this embodiment, the control system was such that the two heat generating elements 204A and 204B were controlled by a single driving element 302. However, the control system may be such that each of the two or more heat generating elements is provided with its own driving element.

Furthermore, the shape of the heat conduction strip 205 is not limited to being long, narrow, and flat, like the one in this embodiment. That is, as long as the heat conduction strip 205 is shaped so that at least a part of it straddles the out-of-sheet-path portions and temperature detection point Q, it is compatible with the present invention.

Embodiment 2

FIG. 9 shows the heater 200, two temperature detection elements 111 and 112, and protection element 112 in this embodiment. FIG. 9A is a plan view of the heater 200 and its peripheral components as seen from the side where the overcoat glass 107 is present, and FIG. 9B is a sectional view of the heater 200 and its peripheral components at plane M-M' in FIG. 9A. FIG. 9C is a sectional view of the heater 200 and its peripheral components at plane O-O' in FIG. 9A. FIG. 9D is a sectional view of the heater 200 and its peripheral components at plane N-N' in FIG. 9A. The heater 200, heat conduction strip 205, and protection element 112 in this embodiment are the same as the counterparts in the first embodiment. Therefore, they are not described here.

In the case of the apparatus in this embodiment, in addition to the temperature detection element 111 placed within the path of the smallest sheet of paper usable with the image forming apparatus 1, a temperature detection element 113 is placed on one of the out-of-sheet-path portions of the nip-less surface of the heater 200. The temperature detection element 113 placed within the out-of-sheet-path range is placed in contact with the nip-less surface of the heater 200, like the temperature detection element 111. The fixing device 100 of the image forming apparatus 1 in this embodiment is the same as the fixing device 100 in the first embodiment, which is shown in FIG. 2. Therefore, it is not described here.

Figure 10:
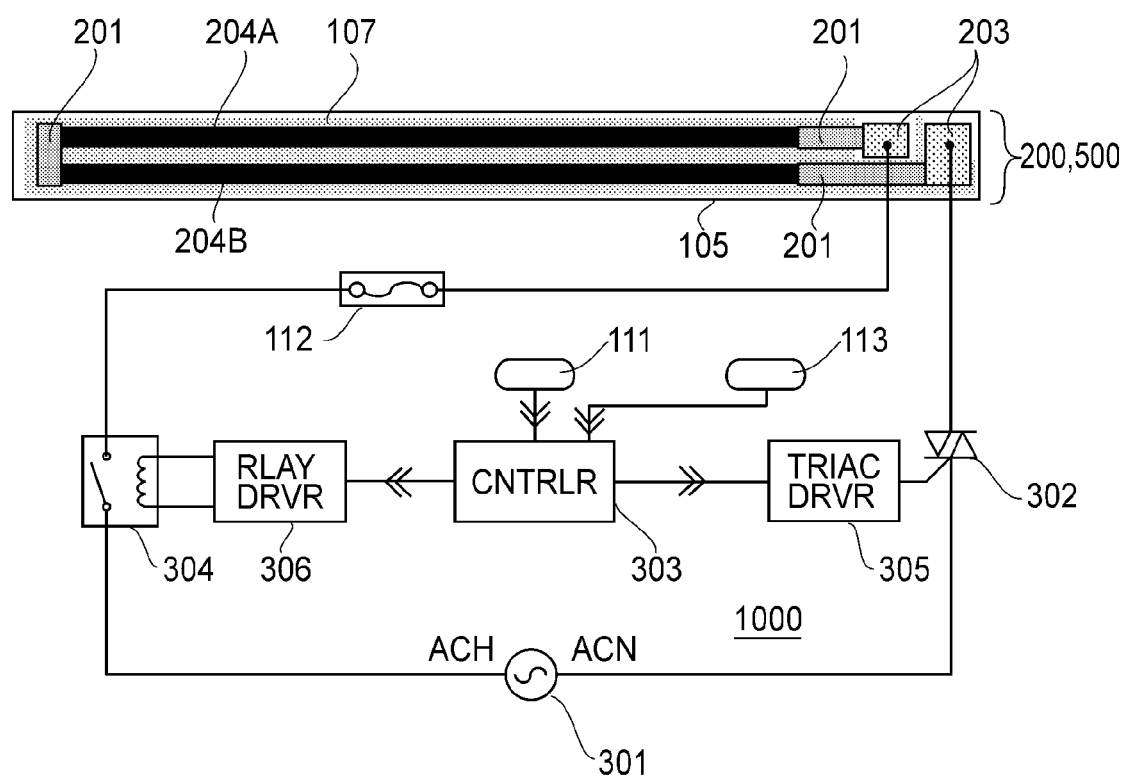
FIG. 10 is a drawing of the circuit for supplying the heater with electric power, in the second to fourth embodiments.

FIG. 10 shows the power supply circuit 1000 (heater controlling device) used in the second embodiment. In this embodiment, the temperature information from the temperature detection element 113 is inputted into the controller 303 in addition to the power supply circuit 1000 used in the first embodiment.

The method for controlling the temperature of the heater 200 is described. Like in the first embodiment, the temperature control target temperature table (FIG. 6) for the case in which the nip-less surface of the heater 200 is not provided with the heat conduction strip 205 is prepared in advance, and is stored in the memory section of the controller 303. In this embodiment, in addition to this table (FIG. 6), adjustment values (adjustment table) which correspond to a difference $\Delta T$ between the temperature detected by the temperature detection element 111 and the temperature detected by the temperature detection element 113 are prepared in advance in the memory (FIG. 11). In this embodiment, the values in the adjustment tables for both the one-sided printing operation and two-sided printing operation are organized according to paper type. The reason why the temperature control is switched in adjustment table according to paper type is the same as the one given in the description of the first embodiment.

The adjustment value is selected according to the recording medium conveyance count and temperature difference $\Delta T$ as shown in FIG. 11. When the recording medium conveyance count is no more than a preset value, the target temperature is adjusted differently from when the recording medium conveyance count is no less than the preset value. As soon as a printing operation is started, $\Delta T$ begins to gradually increase (point P is higher in temperature than point Q). As the recording medium conveyance count reaches a certain value, $\Delta T$ becomes largest in value. Thereafter, $\Delta T$ gradually reduces. This phenomenon occurs for the following reason: that is, when the print count is small, the temperature of the out-of-sheet-path portions has not substantially increased. Therefore, $\Delta T$ is small. Thereafter, as the out-of-sheet-path areas continue to increase in temperature, $\Delta T$ increases. Then as the printing operation continues, $\Delta T$ reduces due to the heat conduction through the heat conduction strip 205.

The adjustment is made by adding the adjustment value to the target temperature in FIG. 6. To describe this adjustment with reference to the one-sided printing operation, in which recording medium is a sheet of recording paper of A4 size, in a case where the fifth sheet of recording paper is about to be subjected to fixation process, and $\Delta T$ is 8° C., 224.8° C., which is the sum of the target temperature 220° C. in FIG. 6 and 4.8° C. (=0.6×$\Delta T$) is used as the target temperature for the temperature control. Furthermore, in a case where the thirteenth sheet of recording paper is about to be subjected to fixation process, and $\Delta T$ is 12° C., 231° C., which is the sum of the target temperature 220° C. in FIG. 6, and 11° C. (=23−$\Delta T$) is used as the target temperature for the temperature control.

Figure 12:
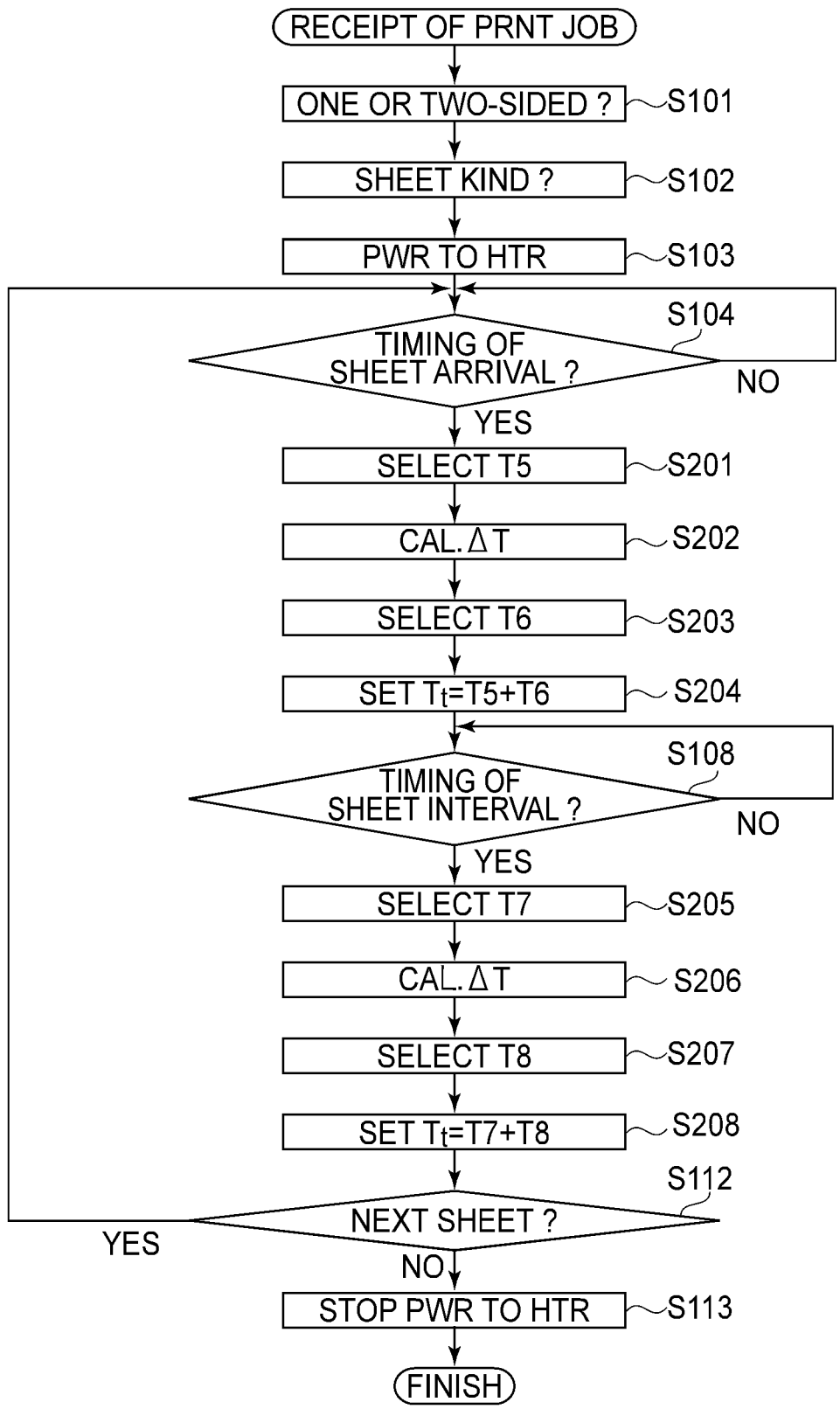
FIG. 12 is a flowchart of the heater temperature control in the second embodiment.

FIG. 12 is the flowchart of the heater temperature control in this embodiment. Here, the flowchart is described with reference to the one-sided printing operation. The sections of FIG. 12, which are the same as the counterparts in FIG. 1, are not described here. As the timing arrives, with which a sheet of recording paper, which is bearing an unfixed toner image, enters the fixing device 100 (S104), the controller 303 selects a target temperature T5 for the sheet conveyance period, according to the ordinal number of the sheet, from the temperature control target temperature table in FIG. 6, which was stored in advance in the memory section of the controller 303 (S201).

The controller 303 obtains the temperature difference $\Delta T$ (=[temperature detected by temperature detection element 113]−[temperature detected by temperature detection element 111]), based on the temperature information from the temperature detection elements 111 and 113 (S202). Then, the controller 303 selects the adjustment value T6 for the sheet conveyance period, from the adjustment table in FIG. 6, which was stored in advance in the memory section of the controller 303 (S203).

The controller 303 then sets Tt, which is the sum of the selected T5 and T6, as the target temperature for the period in which a sheet of recording paper will be conveyed through the fixing device 100 (S204), and controls the Triac 302. Then as the timing with which the sheet of recording paper, which is being conveyed through the fixing device 100, is conveyed out of the fixing device 100 arrives (S108), the controller 303 selects a target temperature T7 for the sheet interval, according to the ordinal number of the sheet, from the target temperature table in FIG. 6 (S205).

The controller 303 calculates $\Delta T$ again (S206), and selects an adjustment value T8 for the sheet interval, from the adjustment table in FIG. 11, based on the obtained value of $\Delta T$ (S207). Then, the controller 303 sets Tt which is the sum of the selected T7 and T8, as the target temperature for the sheet interval (S208), and controls the Triac 302.

In this embodiment, two temperature detection elements were used. However, the number of the temperature detection elements may be increased to improve the adjustment in accuracy. Furthermore, in this embodiment, each of various types of recording paper is provided with its own adjustment table which provides the relationship between the adjustment value and $\Delta T$. However, the heater 200 may be controlled with the use of a single adjustment table, that is, without taking the recording medium type into consideration, as long as an unfixed toner image can be satisfactorily fixed in terms of image quality.

Furthermore, in this embodiment, the fixing method which uses two tables, that is, the target temperature table (FIG. 6) for the case where the nip-less surface of the heater 200 is not provided with the heat conduction strip 205, and the adjustment table (FIG. 11), was described. However, the heater 200 may be temperature-controlled with the provision of only one target temperature table, which is created in consideration of the recording medium count and ΔT.

Embodiment 3

Figure 13:
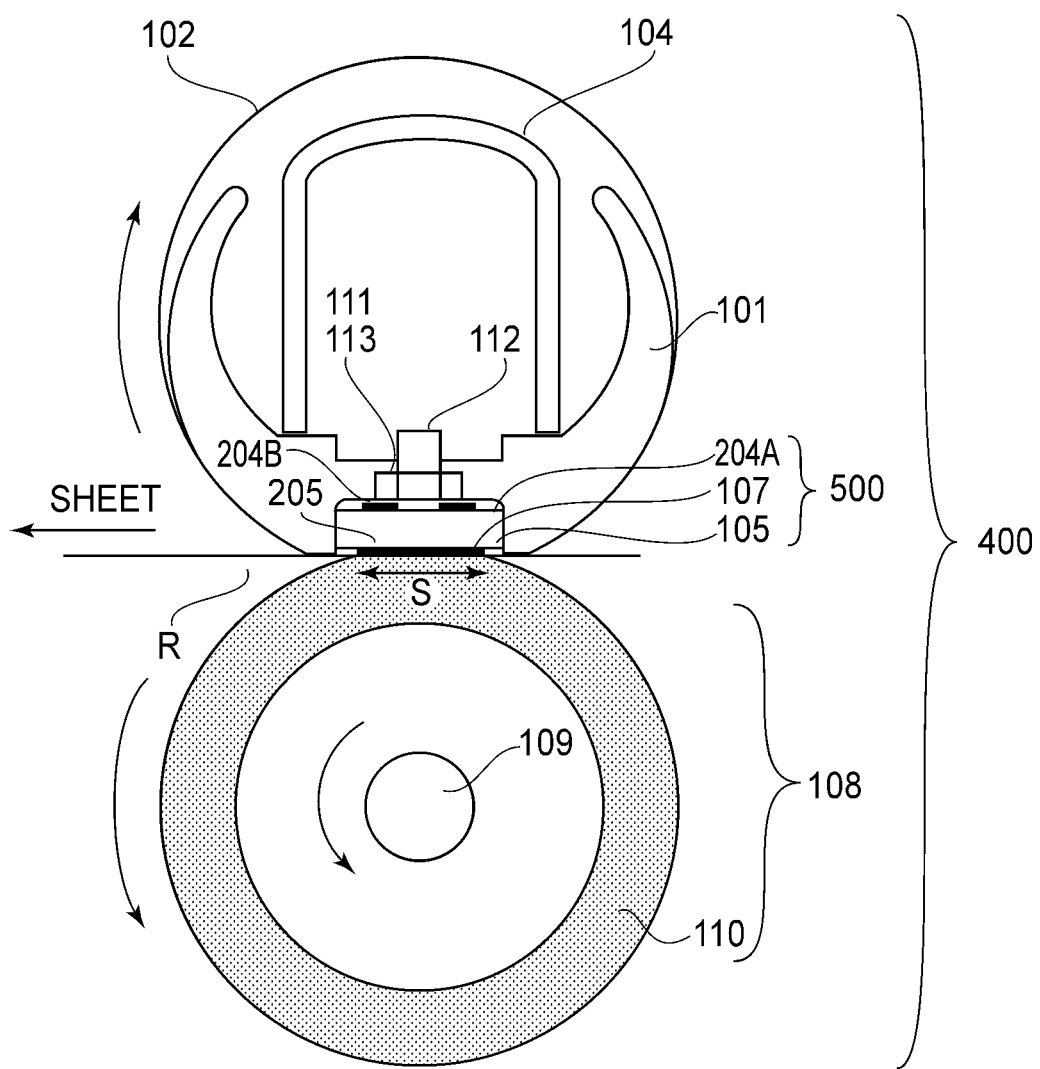
FIG. 13 is a sectional view of the fixing device in the third and fifth embodiments.
Figure 14A:
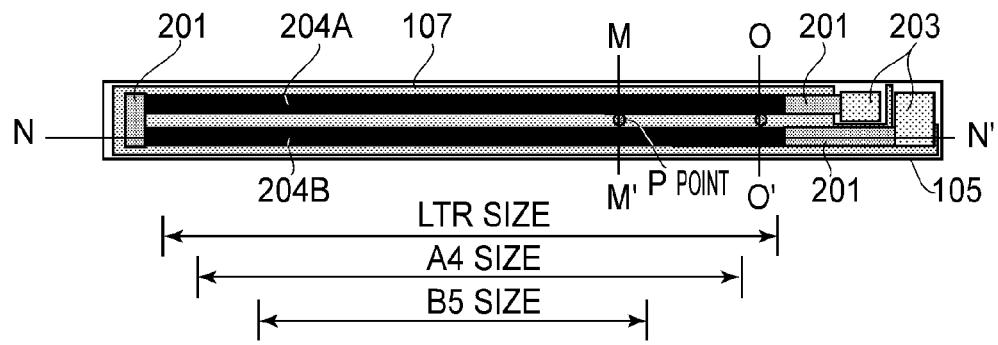
FIGS. 14A-14D are drawings of the heater and its peripheral components, in the third embodiment.
Figure 14B:
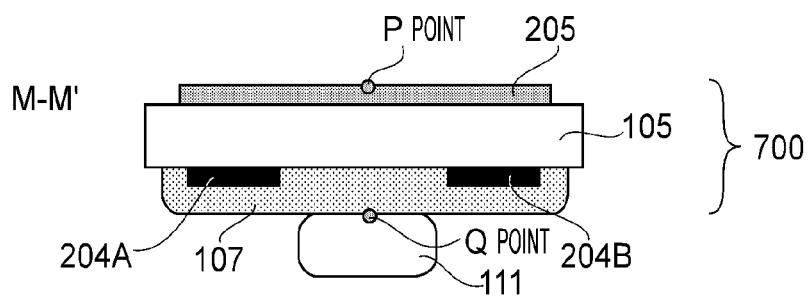
Figure 14C:
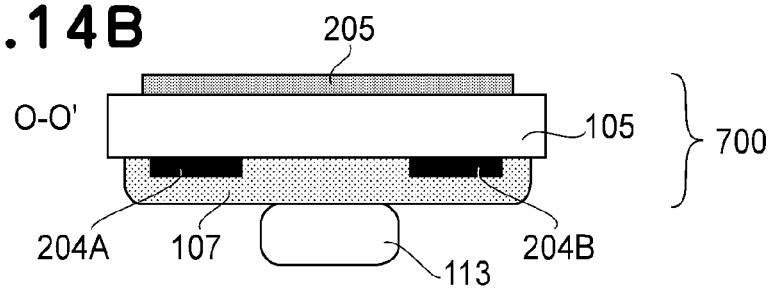
Figure 14D:
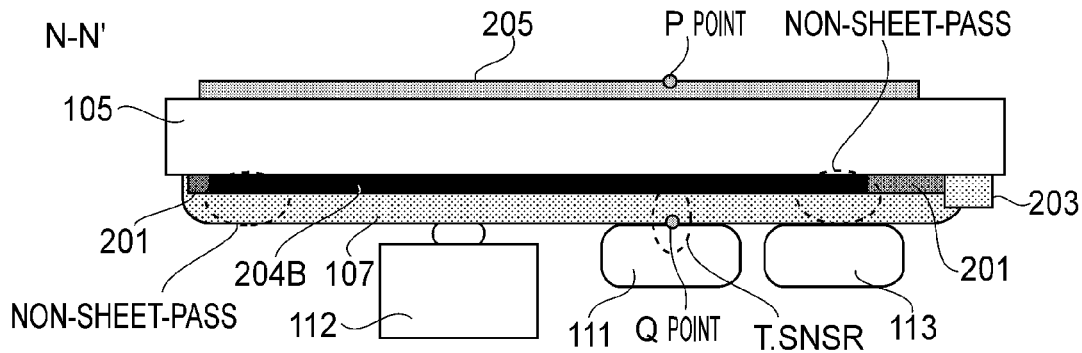

FIG. 13 is a sectional view of the fixing device 400, as an example of an image heating device in this embodiment, which is employed by the image forming apparatus 1. The components of the fixing device 400, which are the same in structure as the counterparts of the fixing device 100 in FIG. 2, are not described here. The fixation nip S is formed by the pressure roller 108 and heater 500, with the fixation film 102 pinched between the pressure roller 108 and the heater 500. In this embodiment, the heat conduction strip 205 and the pressure roller 108 form the fixation nip S with the fixation film 102 being sandwiched between the heat conduction strip 205 and the pressure roller 108.

The heat generated in the heat generation elements 204A and 204B conducts through the ceramic substrate 105 in the thickness direction of the substrate 105, and then, is given to the fixation nip S through the heat conduction strip 205 and fixation film 102. A structure such as the one described above is selected in a case where the ceramic substrate 105 is superior in thermal conduction than the overcoat glass 107.

The temperature detection element 111 is placed in contact with a portion of the nip-less surface (surface having overcoat glass 107) of the heater 500, which is within the path of a sheet of recording paper of the smallest size selected by the image forming apparatus 1, whereas the temperature detection element 113 is placed in contact with one of the portions of the nip-less surface of the heater 500, which is outside the path of the sheet of recording paper of the smallest size. The electrical power supplied to the heater 500 from a commercial AC power source is controlled based on the temperature information detected by the temperature detection element 111.

FIG. 14 shows the heater 500, temperature detection elements 111 and 113, and protection element 112 in this embodiment. FIG. 14A is a plan view of the heater 500 as seen from the side where the overcoat glass 107 is present, and FIG. 14B is a sectional view of the heater 500 at plane M-M' in FIG. 14A. FIG. 14C is a sectional view of the heater 500 at plane O-O' in FIG. 14A, and FIG. 14D is a sectional view of the heater 500 at plane N-N' in FIG. 14A. The heater 500 in this embodiment is the same as the heater 200 in the first embodiment, and therefore, is not described here. In this embodiment, it is the nip forming surface (the opposite surface from the surface that has heat generation elements 204A and 204B) of the heater 500 that is provided with the thermally conductive strip 205. As the driving circuit, the one shown in FIG. 10 is employed. The operation of the driving circuit is the same as that of the driving circuit in the second embodiment, and therefore, is not described here.

Next, the temperature control of the heater 500 is described. Like in the second embodiment, the target temperature table (FIG. 6) for the case in which a heater 500 is not provided with a heat conduction strip 205 is prepared in advance, and is stored in the memory section of the controller 303. In addition, in this embodiment, adjustment values (adjustment table), which correspond to the difference ΔT between the temperature detected by the temperature detection element 111 and the temperature detected by the temperature detection element 113, are prepared in advance (FIG. 15). Also in this embodiment, the values in the adjustment tables for both the one-sided printing operation and two-sided printing operation are organized according to paper type. The reason why the temperature control is switched in adjustment table according to paper type is the same as the one given in the description of the first embodiment.

The adjustment values are decided based on the temperature difference ΔT as shown in FIG. 15. As a printing operation continues, the temperature difference between point P which is on the heat conduction strip 205, and point Q which is on the overcoat glass 107, increases (point P becomes higher in temperature). Furthermore, as the printing operation continues, the out-of-sheet-path areas become higher in temperature. Therefore, the difference ΔT between the temperature detected by the temperature detection element 111 and the temperature detected by the temperature detection element 113 becomes greater (temperature detected by temperature detection element 113 is higher than the temperature detected by temperature detection element 111).

Therefore, the temperature of point P can be kept at a preset level by using adjustment values obtained by multiplying ΔT by a preset constant. To describe the heater temperature controlling method in this embodiment, with reference to the one-sided printing operation in which sheets of recording paper of A4 size, when an image is formed on the 50th sheet of recording paper and ΔT is 8° C., 216.0° C., which is obtained by subtracting 4.0° C. (=0.5×ΔT) from 220° C. in FIG. 6, is used as the target temperature for the temperature control.

Figure 16:
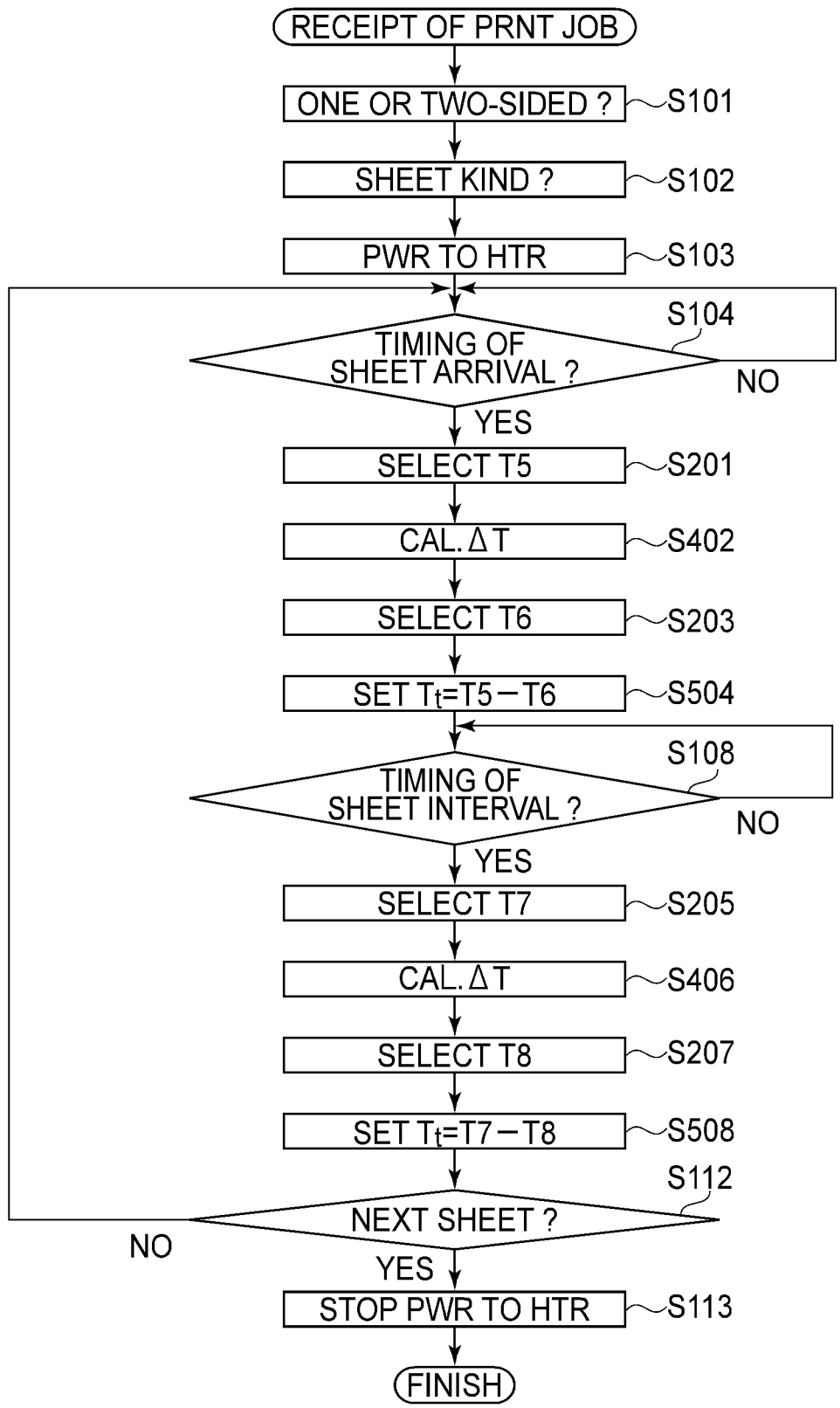
FIG. 16 is a flowchart of the heater temperature control, in the third embodiment.

FIG. 16 shows the flowchart of the temperature control sequence in this embodiment. This flowchart is the same in basic structure as the one in FIG. 2, and therefore, is not described here. In this embodiment, a target temperature Tt for the period in which a sheet R of recording paper will be conveyed through the fixing device 100, is obtained by subtracting T6 from T5 (Tt=T5−T6) (S504). The target temperature Tt for the sheet interval is obtained by subtracting T8 from T7 (Tt=T7−T8) (S508).

Figure 17A:
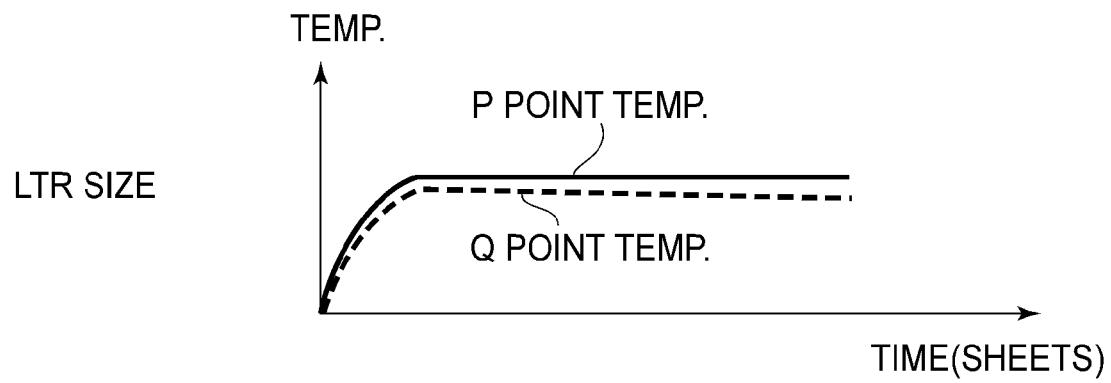
FIGS. 17A and 17B are drawings which show the results of the heater temperature control which uses the temperature control method, in the third embodiment.
Figure 17B:
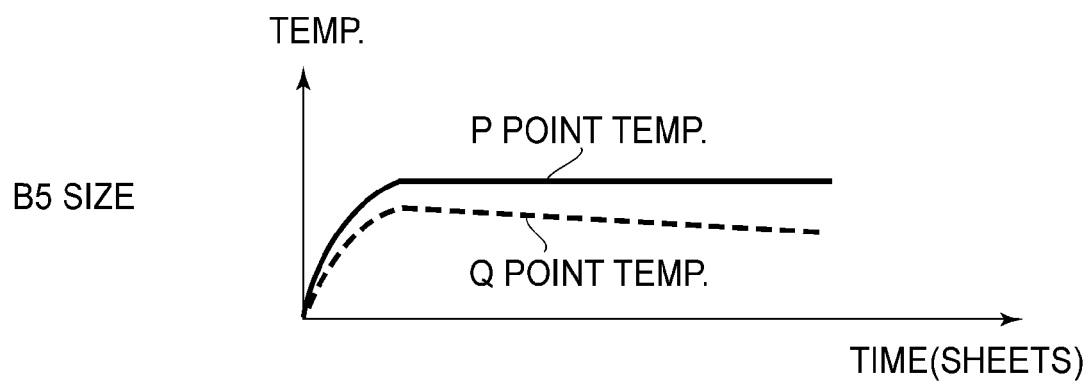
Figure 18A:
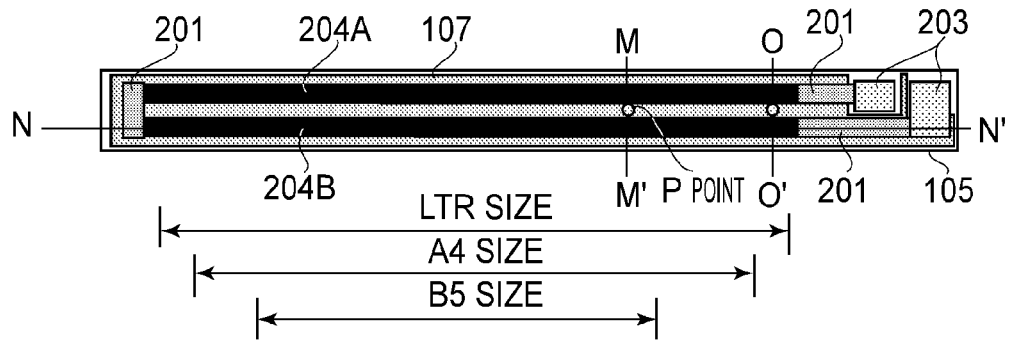
FIGS. 18A-18D are drawings of the heater and its peripheral components, in the fourth embodiment.
Figure 18B:
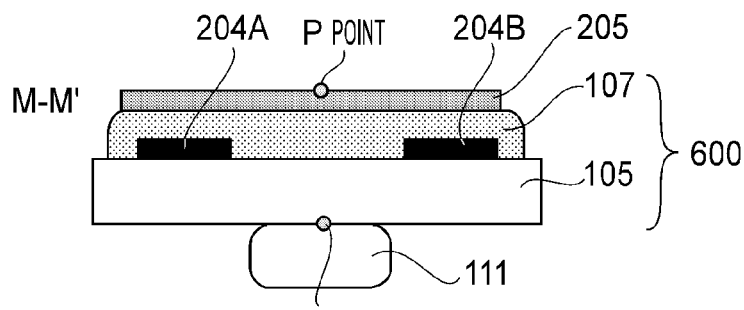
Figure 18C:
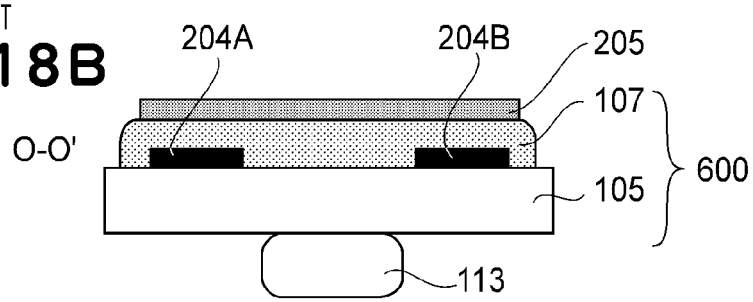
Figure 18D:
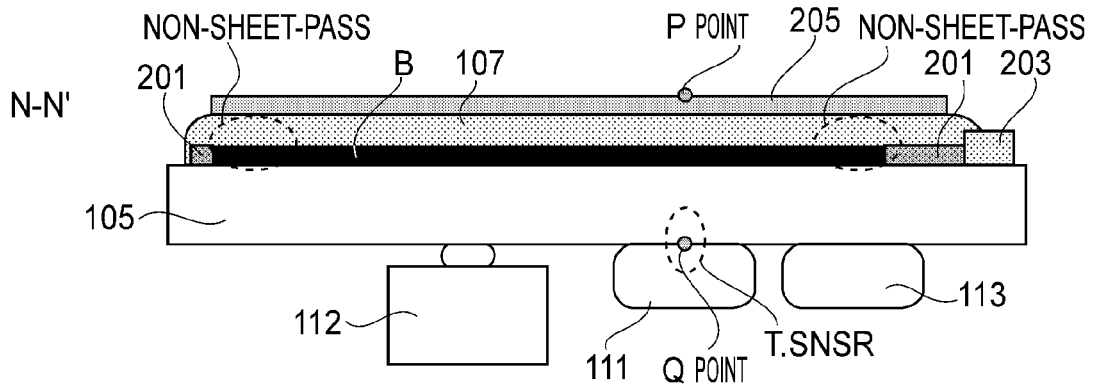

FIG. 17 shows the manner in which the heater 500 was controlled in temperature in the one-sided printing operation in which recording medium were sheets of recording paper of LETTER size, and the one-sided printing operation in which recording medium were sheets of recording paper of LEGAL size. As the printing operation continues, the temperature of point P continues to increase, because of the heat attributable to the unwanted temperature increase of the out-of-sheet-path areas, and the conduction of this heat to point P by the heat conduction strip 205. In this embodiment, the temperature of point P is kept stable at a preset level by properly reducing the target temperature for point Q with the use of the adjustment values in FIG. 15. By the way, adding the manner in which the target temperature was switched between the sheet conveyance period and sheet interval, to FIG. 17 makes FIG. 17 excessively detailed and visually annoying. Therefore, the manner in which the target temperature was switched is not shown in FIG. 17.

In this embodiment, two temperature detection elements were used. However, the number of the temperature detection elements may be increased to improve the adjustment in accuracy. Further, in this embodiment, each of various types of recording paper is provided with its own adjustment table which provides the relationship between the adjustment value and ΔT. However, the heater 500 may be controlled with the use of a single adjustment table which relates to the sheet conveyance count and ΔT, that is, without taking recording medium type into consideration, as long as an unfixed toner image can be satisfactorily fixed in terms of image quality.

Furthermore, in this embodiment, the fixing method which uses two tables, that is, the target temperature table (FIG. 6) for the case where the nip-less surface of the heater 500 is not provided with the heat conduction strip 205, and the adjustment table (FIG. 15), was described. However, the heater 200 may be temperature controlled with the provision of only one target temperature table, which was created in consideration of recording medium count and ΔT.

Furthermore, in this embodiment, the target temperature was set based on the difference between the target temperature table in FIG. 6, and the adjustment table in FIG. 15. However, the heater 500 may be controlled in temperature based on the sum of the temperature detected by the temperature detection element 111 and the temperature in the adjustment table in FIG. 15, with reference to the target temperature in FIG. 6. The result of such temperature control is the same as the result of the temperature control in this embodiment. Therefore, the adjustment may be made with the use of a method such as this one.

Embodiment 4

FIG. 18 shows the heater 600, the temperature detection elements 111 and 113, and the protection element 112 in this embodiment. FIG. 18A is a top view of the heater 600, and FIG. 18B is a sectional view of the heater 600 at plane M-M' in FIG. 18A. FIG. 18C is a sectional view of the heater 600 at plane O-O' in FIG. 18A, and FIG. 18D is a sectional view of the heater 600 at plane N-N' in FIG. 18A. The heater 600 in this embodiment is the same as the heater 200 in the first embodiment, except for the positioning of the heat conduction strip 205, and therefore, is not described in detail here.

In this embodiment, it is the overcoat glass 107 of the heater 500 that is provided with the heat conduction strip 205. A sheet R of recording paper is conveyed through the nip S formed by the heat conduction strip 205 and pressure roller 108, while remaining pinched between the fixation film 102 and pressure roller 108.

The fixing device employed by the image forming apparatus 1 is the same as the fixing device 100 in the first embodiment, except for the location of the heat conduction strip 205 and the number of the temperature detection elements, and therefore, is not described here (FIG. 2). Furthermore, the driving circuit employed in this embodiment is the same as the one employed in the second embodiment, and therefore, is not described (FIG. 10).

The temperature control of the heater 600 is described here. Like in the third embodiment, a target temperature table (FIG. 6) for the case in which a heater is not provided with the heat conduction strip 205, is prepared in advance, and is stored in the memory section of the controller 303. In addition, in this embodiment, adjustment values (adjustment table) which correspond to the temperature differences ΔT between the temperature detected by the temperature detection element 111 and the temperature detected by the temperature detection element 113 are prepared in advance (FIG. 15).

The concrete temperature control in this embodiment is the same as the one in the third embodiment, and therefore, is not described here. Because of the heat from the unwanted temperature increase of the out-of-sheet-path areas, and the effect of the conduction of this heat by the heat conduction strip 205, the temperature of point P becomes higher than the temperature of point Q. Therefore, the temperature of point P was kept stable at a desired level by properly reducing the target temperature for point Q with reference to the adjustment values in FIG. 15.

Embodiment 5

Figure 19A:
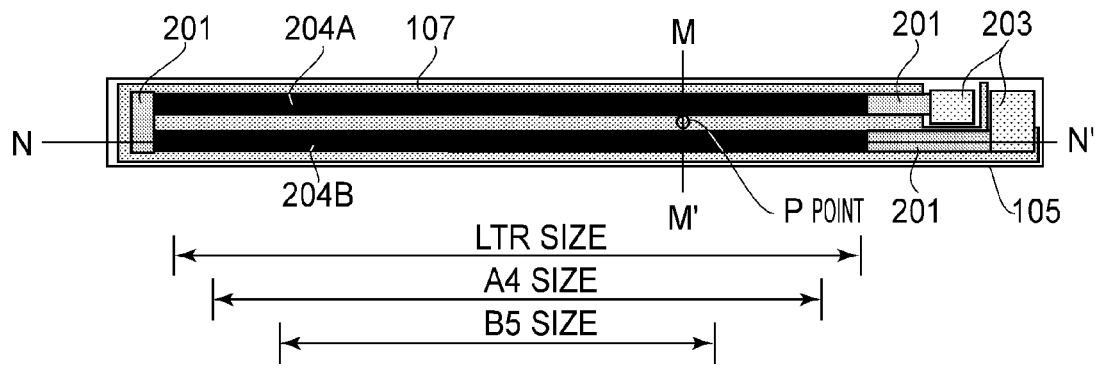
FIGS. 19A-19C are drawings of the heater and its peripheral components, in the fifth embodiment.
Figure 19B:
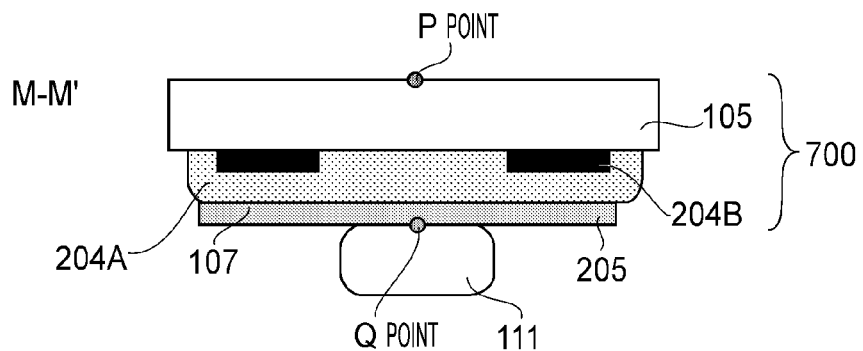
Figure 19C:
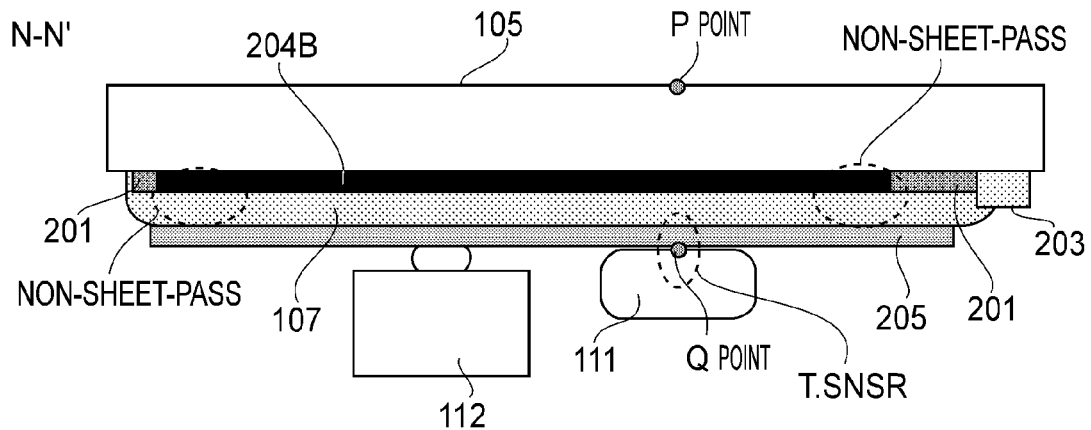
Figure 20:
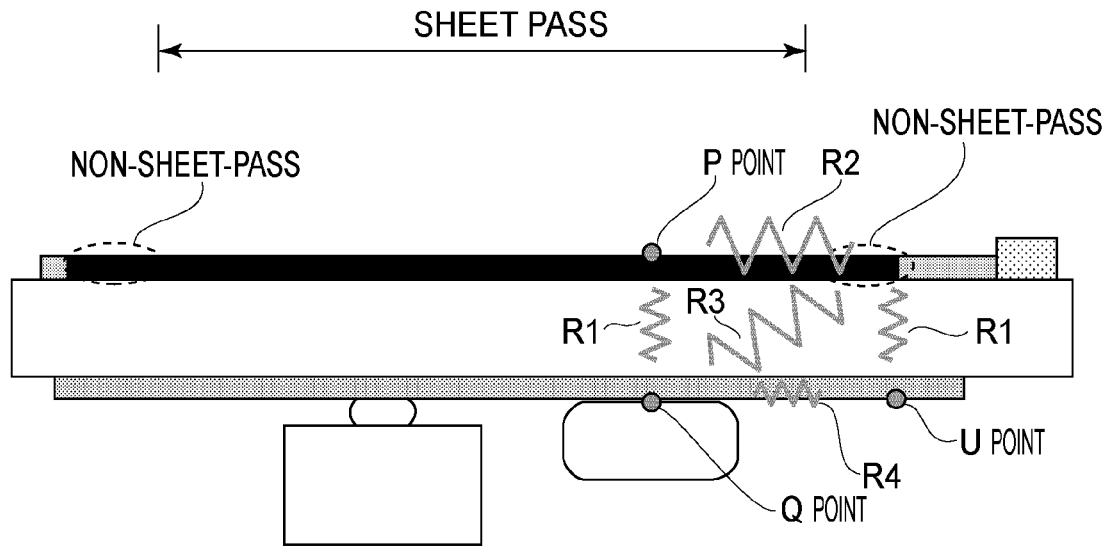
Figure 21A:
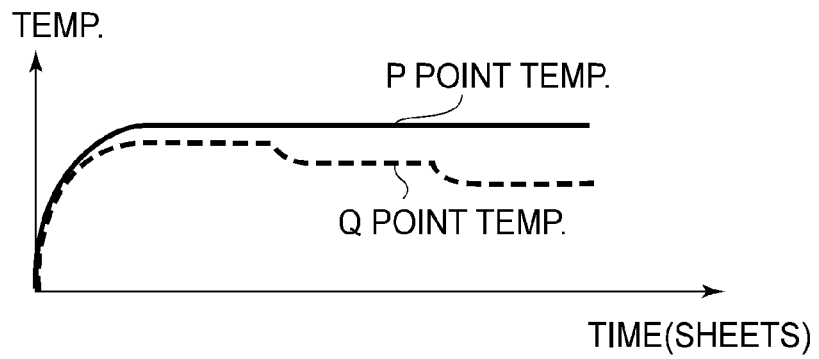
FIGS. 21A and 21B are drawings which show the changes in the temperature of point P and those of point Q, and they are for describing the problems which conventional fixing devices suffer.
Figure 21B:
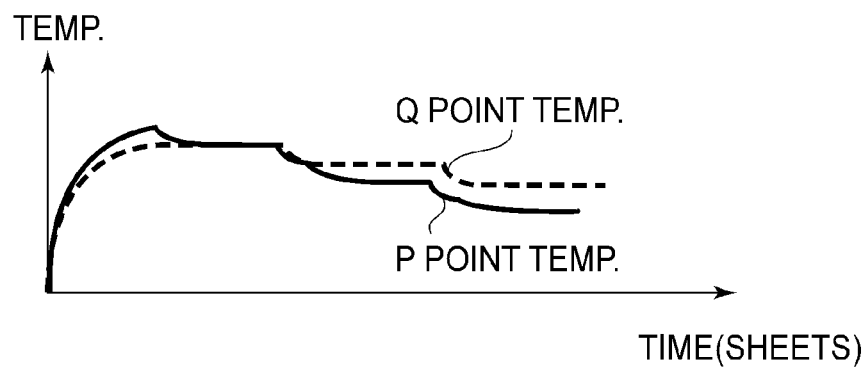
Figure 22A:
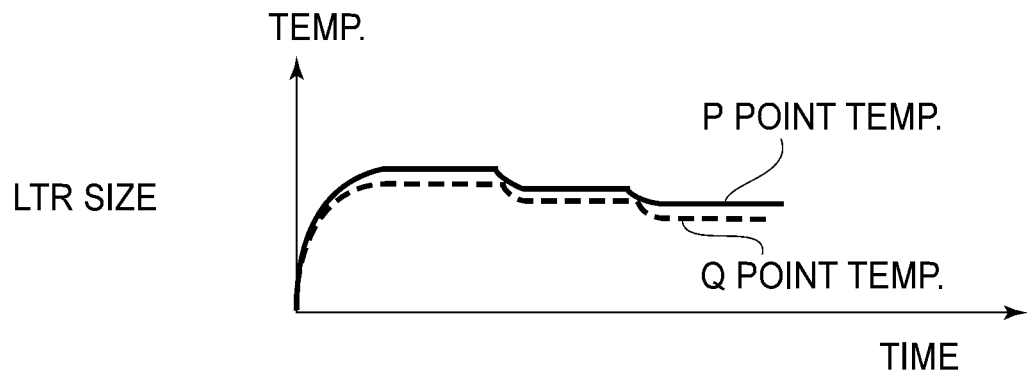
FIGS. 22A-22C are drawings which show the changes in the temperature of point P and those in the temperature of point Q, and which is for describing the problems from which conventional fixing devices suffer.
Figure 22B:
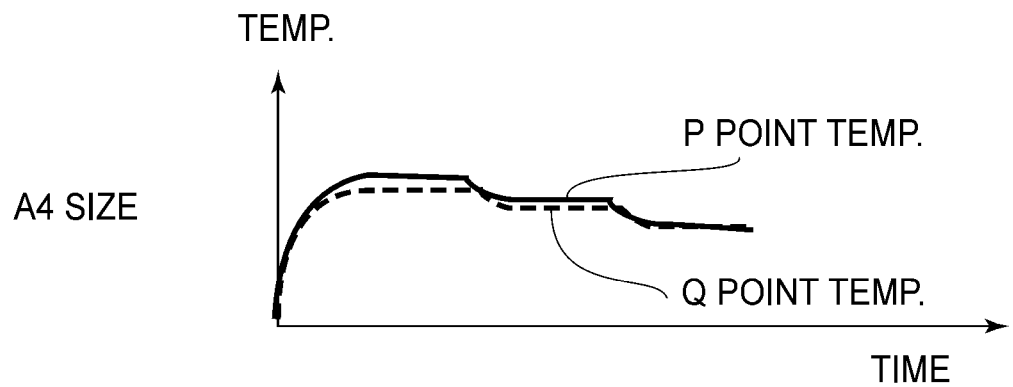
Figure 22C:
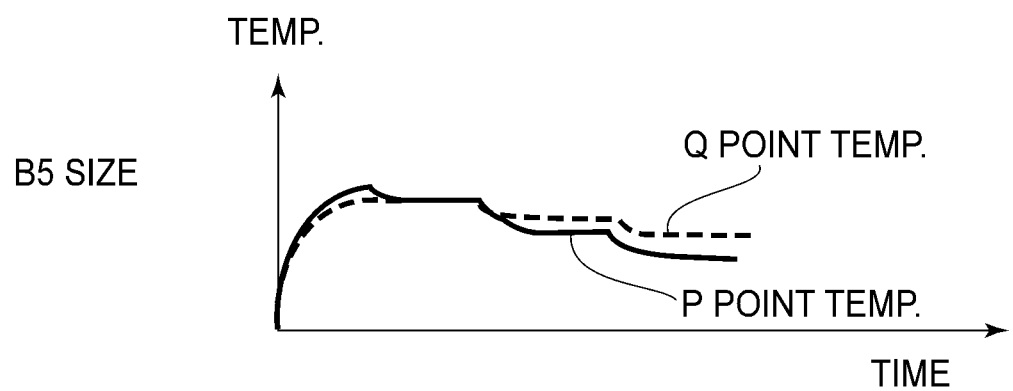

FIG. 19 shows the heater 700, the temperature detection elements 111 and 113, and the protection element 112 in this embodiment. FIG. 19A is a plan view of the heater 700 as seen from the side where the overcoat glass 107 is present, and FIG. 19B is a sectional view of the heater 700 at a plane M-M' in FIG. 19A. FIG. 19C is a sectional view of the heater 700 at plane N-N' in FIG. 19A. The heater 700 in this embodiment is the same as the heater in the third embodiment, except for the location of the heat conduction strip 205 and the number of temperature detection elements, and therefore, is not described in detail here.

In this embodiment, it is on the overcoat glass 107 that the heat conduction strip 205 of the heater 700 is placed. Furthermore, the fixing device 100 employed by the image forming apparatus 1 is the same as the one in the third embodiment, except for the location of the heat conduction strip 205 and the number of the temperature detection elements, and therefore, is not described here (FIG. 13). Furthermore, the driving circuit employed in this embodiment is the same as the one employed in the first embodiment, and therefore, not described here.

The temperature control of the heater 700 is described here. As in the first embodiment, the target temperature table (FIG. 6) for the case in which the heater 700 is not provided with the heat conduction strip 205, and the adjustment table (FIG. 7) which is based on the recording medium conveyance count, are provided, and the temperature of the heater 700 is controlled following the flowchart in FIG. 1.

As the heater 700 was controlled in temperature, its temperature changed as shown in FIG. 8. It is evident from FIG. 8 that the temperature of point P was kept stable at a desired level by properly increasing the temperature of point Q with the use of the adjustment values in FIG. 7. Because of the effect of the heat conduction strip 205, the heat of the out-of-sheet-path areas are conducted to point Q by a large amount, and therefore, the temperature of point Q becomes higher than the temperature of point P. Thus, the temperature of point P was kept stable at the desired level by properly raising the target temperature for point Q.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-102158 filed on May 16, 2014, which is hereby incorporated by reference herein in its entirety.

What is claimed is:

1. An image forming apparatus comprising:
   a fixing portion configured to heat and fix an unfixed image formed on a recording material to the recording material, said fixing portion including a heater having a substrate and a heat generating element provided on said substrate, a heat leveling member contacting said heater and having a thermal conductivity higher than that of said substrate, and a temperature detecting member configured to detect a temperature of said heat leveling member; and
   a controller configured to control electric power supplied to said heater so that the detected temperature of said temperature detecting member is maintained at a target temperature by lowering or raising the target temperature, wherein a period in which said controller raises the target temperature with an increase of the number of the recording materials, and a timing at which said controller lowers the target temperature, are provided in a period in which recording materials having widths smaller than a width of a maximum size recording material usable with said apparatus are continuously subjected to fixing operations.

2. An apparatus according to claim 1, wherein said apparatus is configured to form the image on both sides of the recording material, and wherein the period in which said controller raises the target temperature with the increase of the number of the recording materials is provided in the period in which recording materials having widths smaller than the width of the maximum size recording material usable with said apparatus are continuously subjected to fixing operations on both sides of the recording materials.

3. An apparatus according to claim 2, wherein said controller sets the target temperature, when a back side of the recording material having an image already fixed on a front side thereof, at a level which is lower than the target temperature when the front side of the recording material is subjected to the fixing operation.

4. An apparatus according to claim 1, wherein said heat leveling member extends in a longitudinal direction of said heater at least in the range from a position where said temperature detecting member is provided to a position where a minimum size recording material usable with said apparatus does not pass.

5. An apparatus according to claim 1, wherein said heat leveling member is made of metal or graphite.

6. An apparatus according to claim 5, wherein said substrate is made of ceramic material.

7. An apparatus according to claim 1, wherein said fixing portion further includes a cylindrical film rotatable while being in contact with the recording material, and said heater is in contact with an inner surface of said film.

8. An image forming apparatus comprising:
a fixing portion configured to heat and fix an unfixed image formed on a recording material to the recording material, said fixing portion including a fixing film, a heater having a substrate and a heat generating element provided on said substrate, a heat leveling member having a thermal conductivity higher than that of said substrate and sandwiched between said fixing film and said heater, and a temperature detecting member configured to detect a temperature of said heater; and
a controller configured to control electric power supplied to said heater so that the detected temperature of said temperature detecting member is maintained at a target temperature,
wherein a period in which said controller lowers the target temperature with an increase of the number of the recording materials is provided in a period in which recording materials having widths smaller than a width of a maximum size recording material usable with said apparatus are continuously subjected to fixing operations, and
wherein said heat leveling member extends in a longitudinal direction of said heater at least in the range from a position where said temperature detecting member is provided to a position where a minimum size recording material usable with said apparatus does not pass.

9. An apparatus according to claim 8, wherein said heat leveling member is made of metal or graphite.

10. An apparatus according to claim 8, wherein said substrate is made of ceramic material.

11. An image forming apparatus comprising:
a fixing portion configured to heat and fix an unfixed image formed on a recording material to the recording material, said fixing portion including a heater having a substrate made of ceramic material and a heat generating element provided on said substrate, a contact member made of metal or graphite contacting said heater, and a temperature detecting member configured to detect the temperature of said contact member; and
a controller configured to control electric power supplied to said heater so that the detected temperature of said temperature detecting member is maintained at a target temperature by lowering or raising the target temperature,
wherein a period in which said controller raises the target temperature with an increase of the number of the recording materials, and a timing at which said controller lowers the target temperature, are provided in a period in which recording materials having widths smaller than a width of a maximum size recording material usable with said apparatus are continuously subjected to fixing operations.

12. An apparatus according to claim 11, wherein said apparatus is configured to form the image on both sides of a recording material, and wherein the period in which said controller raises the target temperature with an increase of the number of the recording materials is provided in the period in which recording materials having widths smaller than the width of the maximum size recording material usable with said apparatus are continuously subjected to fixing operations on both sides of the recording materials.

13. An apparatus according to claim 12, wherein said controller sets the target temperature, when a back side of the recording material having an image already fixed on a front side thereof, at a level which is lower than the target temperature when the front side of the recording material is subjected to the fixing operation.

14. An apparatus according to claim 11, wherein said contact member extends in a longitudinal direction of said heater at least in the range from a position where said temperature detecting member is provided to a position where a minimum size recording material usable with said apparatus does not pass.

15. An apparatus according to claim 11, wherein said fixing portion further includes a cylindrical film rotatable while being in contact with the recording material, and said heater is in contact with an inner surface of said film.

* * * * *